United States Patent
Fan et al.

(10) Patent No.: US 9,699,375 B2
(45) Date of Patent: *Jul. 4, 2017

(54) METHOD AND APPARATUS FOR DETERMINING CAMERA LOCATION INFORMATION AND/OR CAMERA POSE INFORMATION ACCORDING TO A GLOBAL COORDINATE SYSTEM

(71) Applicant: NOKIA TECHNOLOGIES OY, Espoo (FI)

(72) Inventors: Lixin Fan, Tampere (FI); Junsheng Fu, Tampere (FI); Kimmo Tapio Roimela, Tampere (FI); Yu You, Kangasala (FI)

(73) Assignee: Nokia Technology Oy, Espoo (FI)

( * ) Notice: Subject to any disclaimer, the term of this patent is extended or adjusted under 35 U.S.C. 154(b) by 200 days.

This patent is subject to a terminal disclaimer.

(21) Appl. No.: 14/015,610

(22) Filed: Aug. 30, 2013

(65) Prior Publication Data
US 2014/0300775 A1 Oct. 9, 2014

Related U.S. Application Data

(63) Continuation-in-part of application No. 13/857,688, filed on Apr. 5, 2013, now Pat. No. 9,558,559.

(51) Int. Cl.
*G09G 5/00* (2006.01)
*H04N 5/232* (2006.01)
(Continued)

(52) U.S. Cl.
CPC ........... *H04N 5/23229* (2013.01); *G06T 7/70* (2017.01); *G06T 19/006* (2013.01);
(Continued)

(58) Field of Classification Search
None
See application file for complete search history.

(56) References Cited

U.S. PATENT DOCUMENTS

2009/0248300 A1* 10/2009 Dunko et al. ................. 701/209
2010/0002071 A1* 1/2010 Ahiska ........................... 348/36
(Continued)

FOREIGN PATENT DOCUMENTS

WO 2010099036 A1 9/2010
WO 2013029675 A1 3/2013

OTHER PUBLICATIONS

Verhoeven et al. (Mapping by matching: a computer vision-based approach to fast and accurate georeferencing of archaeological aerial photographs, vol. 39, Issue 7, Jul. 2012, pp. 2060-2070, Journal of Archaeoiogicai science).*
(Continued)

*Primary Examiner* — Kyle Zhai
(74) *Attorney, Agent, or Firm* — Ditthavong & Steiner, P.C.

(57) ABSTRACT

An approach is provided for processing and/or facilitating a processing of one or more images to determine camera location information, camera pose information, or a combination thereof associated with at least one camera capturing the one or more images, wherein the camera location information, the camera pose information, or a combination thereof is represented according to a global coordinate system. The approach involves causing, at least in part, an association of the camera location information, the camera pose information, or a combination thereof with the one or more images as meta-data information.

16 Claims, 37 Drawing Sheets

(51) Int. Cl.
 G06T 19/00 (2011.01)
 H04N 1/32 (2006.01)
 G06T 7/70 (2017.01)
(52) U.S. Cl.
 CPC .......... *H04N 1/32128* (2013.01); *G06T 2207/30244* (2013.01); *H04N 2201/3252* (2013.01); *H04N 2201/3253* (2013.01)

(56) References Cited

U.S. PATENT DOCUMENTS

| 2010/0035637 | A1* | 2/2010 | Varanasi et al. ............... 455/457 |
| 2011/0007962 | A1* | 1/2011 | Johnson ............ G06F 17/30781 382/154 |
| 2011/0169946 | A1* | 7/2011 | Rudin ...................... G01S 5/16 348/135 |
| 2012/0086727 | A1 | 4/2012 | Korah et al. |
| 2012/0163656 | A1 | 6/2012 | Wang et al. |
| 2013/0016123 | A1 | 1/2013 | Skarulis |

OTHER PUBLICATIONS

Becker et ai. (Combined ieature extraction for fa-ade reconstruction, ISPRS workshop on laser scanning 2007).*
Wagner et al. (Real-time Panoramic Mapping and Trackng on Mobile Phones, Mar. 20-24, 2010, pp. 211-218, IEEE).*
Snavely et al. (Photo Tourism: Exploring Photo Collection in 3D, 2006, ACM).*
Larson et al., "Automatic Tagging and Geotagging in Video Collections and Communities," Article No. 51, International Conference on Multimedia Retrieval (ICMR), Trento, Italy, Apr. 2011, 8 pages.
National Geospatial-Intelligence Agency, "NGA Standardization Document, Frame Sensor Model Metadata Profile Supporting Precise Geopositioning," Jul. 21, 2009, Version 2.0, 56 pages.
Teller et al., "Calibrated, Registered Images of an Extended Urban Area," Conference Publication, International Journal of Computer Vision, Jun. 2003, vol. 53, pp. 93-107.
Timo, "Nokia Challenge 2010: Where was this Photo Taken, and How?" website, http://comminfo.rutgers.edu/conferences/mmchallenge/2010/02110/nokia-challenge/, pp. 1-6.
Vasile et al., "Efficient City-Sized 3D Reconstruction from Ultra-high Resolution Aerial and Ground Imagery," published by Springer Berlin Heidelberg, 2010, vol. 6938, pp. 347-358.
International Search Report for International Application No. PCT/FI2014/050167, mailed Jul. 7, 2014, 5 pages.
Notification of Transmittal of the International Search Report and Written Opinion of the International Searching Authority, or the Declaration and Written Opinion for International Application No. PCT/FI2014/050167, mailed Jul. 7, 2014, 10 pages.
Arth et al. "Real-Time Self-Localization from Panoramic Images on Mobile Devices", IEEE International Symposium on Mixed and Augmented Reality, Science and Technology Proceedings, pp. 37-46, Oct. 26-29, 2011.
Liu et al. "A systematic approach for 2D-image to 3D-range registration in urban environments", Computer Vision and Image Understanding, vol. 116, Issue 1, pp. 25-37, Jan. 2012.
Office Action for the Corresponding European Patent Application No. 14780308.4—1906, dated Dec. 7, 2016, 8 Pages.
Liu et al., "Finding Perfect Rendezvous On the Go: Accurate Mobile Visual Localization and Its Applications to Routing", Proceedings of the 20th ACM International Conference on Multimedia, MM '12, Oct. 29-Nov. 2, 2012, 10 pages.
Hile et al., "Landmark-Based Pedestrian Navigation with Enhanced Spatial Reasoning", Pervasive Computing, Springer Berlin Heidelberg, May 11, 2009, pp. 59-76.
Bourke et al., "The Social Camera: A Case-Study in Contextual Image Recommendation", IUI '11: Proceedings of be 16th international conference on Intelligent user interfaces, Feb. 13-16, 2011, 12 pages.
Snavely et al., "Photo Tourism: Exploring Photo Collections in 3D", ACM Transactions on Graphics, vol. 25 Issue 3, Jul. 1, 2006, 12 pages.

\* cited by examiner

METHOD AND APPARATUS FOR DETERMINING CAMERA LOCATION INFORMATION AND/OR CAMERA POSE INFORMATION ACCORDING TO A GLOBAL COORDINATE SYSTEM

RELATED APPLICATION

This application is a Continuation in Part of U.S. patent application Ser. No. 13/857,688 filed Apr. 5, 2013 entitled "Method and Apparatus for Determining Camera Location Information and/or Camera Pose Information According to a Global Coordinate System," which is incorporated herein by reference in its entirety.

BACKGROUND

Service providers and device manufacturers (e.g., wireless, cellular, etc.) are continually challenged to deliver value and convenience to consumers by, for example, providing compelling network services. One area of development has been the integration of location and image data to enable various services, for instance, navigation systems may use an image to determine location information associated with the image. However, even with the availability of associated images, their use with respect to providing location information has generally been limited. For example, point of interest (POI) information may be available in one or more images, however these readily available images have not been properly utilized because of lack mechanisms for associating them. Further, inefficient usage of geo-location metadata associated with video frames diminishes the effectiveness and efficiency for video sharing services. Accordingly, service providers and device manufacturers face significant technical challenges in enabling an automated analytic tool that finds camera position for uploaded images, thereby adding another dimension of location data from captured images to enhance user convenience.

SOME EXAMPLE EMBODIMENTS

Therefore, there is a need for an approach for processing one or more images to determine camera location information and/or camera pose information, wherein the information are represented according to a global coordinate system, thereby causing, at least in part, an association of these information with the one or more images as meta-data information.

According to one embodiment, a method comprises processing and/or facilitating a processing of one or more images to determine camera location information, camera pose information, or a combination thereof associated with at least one camera capturing the one or more images, wherein the camera location information, the camera pose information, or a combination thereof is represented according to a global coordinate system. The method also comprises causing, at least in part, an association of the camera location information, the camera pose information, or a combination thereof with the one or more images as meta-data information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more images to determine camera location information, camera pose information, or a combination thereof associated with at least one camera capturing the one or more images, wherein the camera location information, the camera pose information, or a combination thereof is represented according to a global coordinate system. The apparatus also causes, at least in part, an association of the camera location information, the camera pose information, or a combination thereof with the one or more images as meta-data information.

According to another embodiment, a computer-readable storage medium carries one or more sequences of one or more instructions which, when executed by one or more processors, cause, at least in part, an apparatus to process and/or facilitate a processing of one or more images to determine camera location information, camera pose information, or a combination thereof associated with at least one camera capturing the one or more images, wherein the camera location information, the camera pose information, or a combination thereof is represented according to a global coordinate system. The apparatus also causes, at least in part, an association of the camera location information, the camera pose information, or a combination thereof with the one or more images as meta-data information.

According to another embodiment, an apparatus comprises means for processing and/or facilitating a processing of one or more images to determine camera location information, camera pose information, or a combination thereof associated with at least one camera capturing the one or more images, wherein the camera location information, the camera pose information, or a combination thereof is represented according to a global coordinate system. The apparatus also comprises means for causing, at least in part, an association of the camera location information, the camera pose information, or a combination thereof with the one or more images as meta-data information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for processing one or more images to determine camera location information and/or camera pose information, wherein the information are represented according to a global coordinate system, thereby causing, at least in part, an association of these information with the one or more images as meta-data information, are disclosed.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Video hosting and sharing services are popular nowadays. Different types of geo-location metadata, such as GPS location and local camera poses are used in existing geo-augmented image/video services. However, these geo-location metadata are limited in several aspects. In one scenario, usually captured images may be geotagged to provide location information for the image, but a geotag is only related to the geographic position of a user's device at the moment of the image capture. As a result, the information captured in the image is missing at least one dimension of information. As mentioned before, even with the availability of associated location data and images, their use with respect to geospatial metadata has generally been limited to information derived from one image capture device without integrating images from other image capture devices. In addition, there is no existing solution to provide a 3D geo-augmented video data within a global coordinate system.

Figure 1:
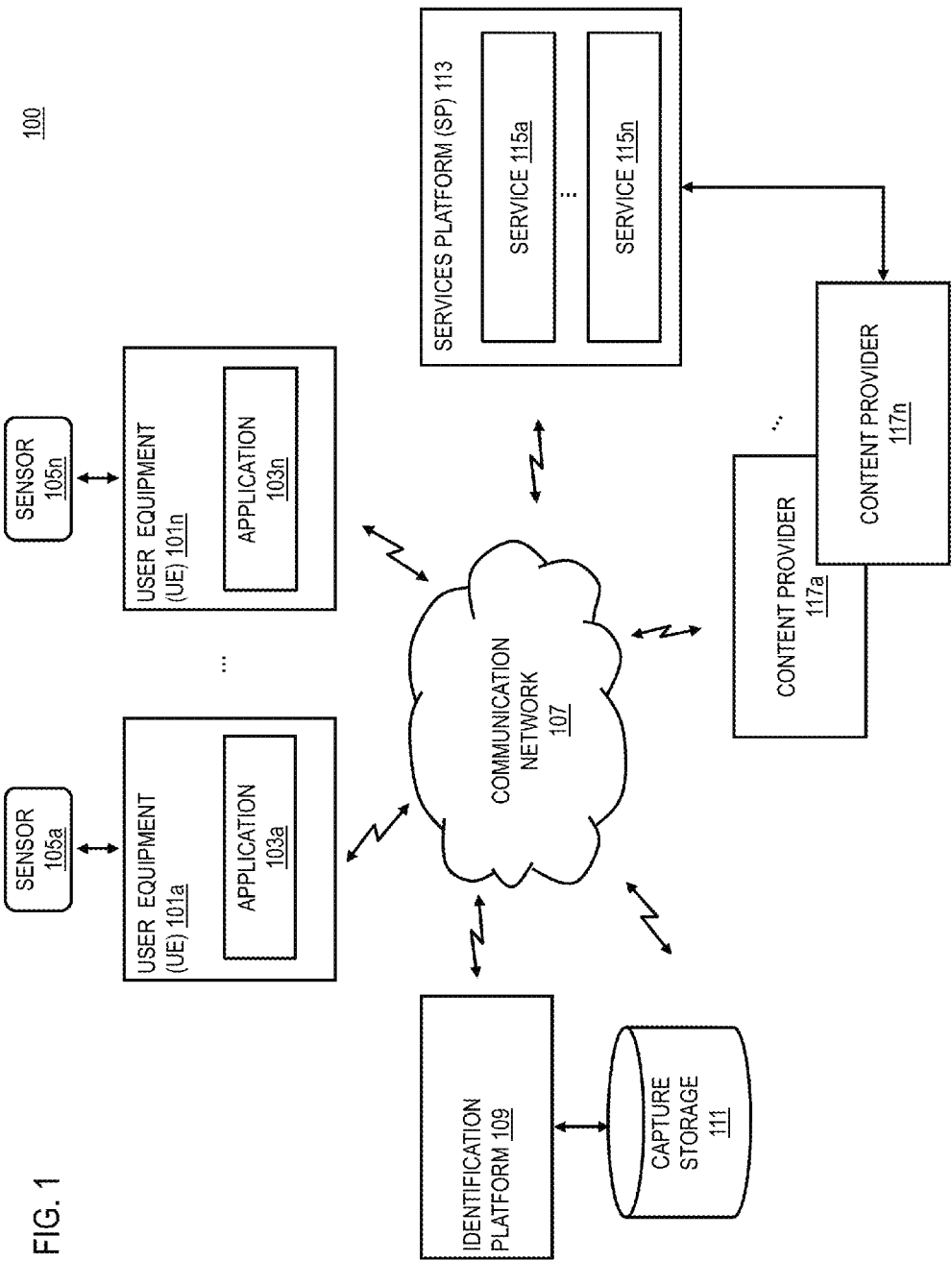
FIG. 1 is a diagram of a system capable of processing one or more images to determine camera location information and/or camera pose information, wherein these information are represented according to a global coordinate system, thereby causing, at least in part, an association of these information with the one or more images as meta-data information, according to one embodiment.

To address this problem, a system 100 of FIG. 1 introduces the capability for an automatic video post-processing method that extracts 3D geo-augmented metadata from input video frames and provides novel user experience in video sharing. In one embodiment, FIG. 1 introduces capability to identify elements within an image and processes the elements for further information, such as location information. In this way, users no longer need to independently look for information about POI in an image. Instead, a user may select POI, or element, in the image, and obtain location information specific to that particular POI, rather than location information that pertains to the full image. In one embodiment, the system is capable of automatically locating the camera pose for each frame in a global coordinate system, thereby when a user uploads a video, the system knows exactly where it was taken and the accurate camera position of each video frame. Further, the system may build navigation or touring video guides from multiple relevant videos around the similar 3D location. In addition, the system may analyze video frames and determine the camera metadata (the geo-location and the camera poses) without gyroscope sensor support.

The system 100 may build on the ready availability of location information and introduce the capability to apply the availability to elements within an image. The term "image" refers to pictures, videos, renderings (e.g., augmented reality renderings, virtual reality renderings), virtual worlds, and/or any other graphical depictions of one or more locations. In one embodiment, it is contemplated that the locations can be real-world locations or virtual locations (e.g., in a virtual world such as a gaming world or other virtual reality simulation). Moreover, the images can be presented in two-dimensions or three-dimensions.

More specifically, the system 100 processes one or more images (e.g., photographs, image streams, videos, pictures, etc.) to determine various elements within an image. In one embodiment, the picture or video may be a panoramic view of a city. In one scenario, elements within the city may be buildings or other landmarks. In some embodiments, the location information of the elements is previously embedded in the image. In other embodiments, location information is determined based on further processing of the image data.

As shown in FIG. 1, the system 100 comprises user equipment (UE) 101a-101n (collectively referred to as UEs 101) that may include or be associated with applications 103a-103n (collectively referred to as applications 103) and sensors 105a-105n (collectively referred to as sensors 105). In one embodiment, the UEs 101 have connectivity to an identification platform 109 via the communication network 107. In one embodiment, the identification platform 109 performs one or more functions associated with processing one or more images to determine camera location information and/or camera pose information, wherein these information are represented according to a global coordinate system, thereby causing, at least in part, an association of these information with the one or more images as meta-data information. Although the various embodiments described herein are discussed with respect to a global coordinate system based on an Earth centered Earth Fixed (ECEF) global coordinate system, it is contemplated that the various embodiments are applicable to any global coordinate system for identifying locations. For example, other applicable global coordinate systems include, but are not limited to, a world geodetic system (WGS84) coordinate system, a universal transverse Mercator (UTM) coordinate system, and the like.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for identification platform 109 and perform one or more functions associated with the functions of the identification platform 109 by interacting with the identification platform 109 over communication network 107.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the camera sensors may provide the users of UE 101 with 3D pose estimation, tracking and clustering functions for suitable camera placement. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one embodiment, the sensors 105 may detect user interaction with a user interface generated by the UE 101, applications 103, and/or the identification platform 109. The sensors 105 may work in conjunction with the identification platform 109, wherein the sensors 105 identifies a point on the user interface that the user selects, such as by brushing, clicking, or touching the screen of UE 101. The identification platform 109 may then correlate point(s) selected within an image, and consequently, find location information associated with that image.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the identification platform 109 may be a platform with multiple interconnected components. The identification platform 109 may include multiple servers, intelligent networking devices, computing devices, components and corresponding software for processing one or more images to determine camera location information and/or camera pose information, wherein these information are represented according to a global coordinate system (e.g., ECEF, WGS84, UTM, etc.), thereby causing, at least in part, an association of these information with the one or more images as meta-data information. In addition, it is noted that the identification platform 109 may be a separate entity of the system 100, a part of the one or more services 115 of the services platform 113, or included within the UE 101 (e.g., as part of the applications 103).

As shown in FIG. 1, the UE 101 may display, via applications 103, one or more images (e.g. pictures or videos). In one embodiment, one or more elements depicted in one or more images may be landmarks or sites within an image. In one scenario, sensors 105 of UE 101 may permit the user to select an element of one or more images. This element selection may then prompt identification platform 109 to process the image data to obtain Global Positioning System (GPS) information associated with the image. The images may depict physical places, but they may also include virtual or computer-generated scenery. In one embodiment, the identification platform 109 may track images, match the images and extract 3D information from the images and then translate the 3D information to the global coordinate system.

In one embodiment, the identification platform 109 may extract geo location metadata from collection of images or sequences of video frames. Such extracted geo location metadata contains registered video frames, corresponding camera poses and reconstructed 3D point clouds defined within, for instance, a local 3D Cartesian coordinate system (CCS_3D_Local system) with known origin and axes. The camera poses and point clouds can be uniquely mapped to a 3D ECEF Cartesian coordinate system (CCS_3D_ECEF) or other global coordinate system (e.g., WGS84, UTM, etc.). In one scenario, the identification platform 109 may choose a camera pose by matching point cloud, and determining an area the point cloud matches up to, and then calculating the perspective of the video to get the camera pose information. The identification platform 109 may perform this process on a frame by frame basis to capture camera movement.

In one embodiment, the identification platform 109 may augment geocoordinate-tagged video by nearby POIs based on associated geo metadata. By way of example geocoordinate-tagged videos are rendered videos which are based on the output of ECEF coordinate tagging engine. In one embodiment, the identification platform 109 may give rise to corresponding change in the rendered POI data creating augmented-reality experience during playback based at least in part, on change of camera poses. In another embodiment, the identification platform 109 may tag panorama images with GPS information (e.g., latitude and longitude in a 2D geographic coordinate system (GCS_2D)), and based on panorama image geo-location information, geocoordinate-tagged video is augmented with nearby panorama images. The geocoordinate-tagged video data is reconstructed within the CCS_3D_ECEF system, making it possible to integrate nearby geocoordinate-tagged videos that are shot at different locations, time and by different people. In one embodiment, the identification platform 109 may provide a digital camera tool which may provide users of UE 101 with instant guidance to favorite photo-taking viewpoint and camera angles with the Viewpoint and Angle Popularity (VAP) meter. According to one embodiment, the tool may be invoked as required whenever a user points the cameras to an outdoor scene, whereby one or more guidance to a favorite photo-taking spot is displayed on digital camera viewfinder screens, in an augmented reality (AR) mode, so that the user may still focus on the composition of photos, thereby solving the problems of users of UE 101 having to memorize favorite viewpoints beforehand and try to localize these spots when they are approaching target places.

In one embodiment, the identification platform 109 may acquire photo information from capture storage 111, which may comprise of but not limited to specification of a photograph exposure set-up parameters, for instance, shooting vantage point, shooting angle, camera settings etc. In one embodiment, the identification platform 109 may receive information from the sensors 105, and store the information on capture storage 111. The capture storage 111 may include identifiers to the UE or image as well as associated information. Further, the information may be any one of multiple types of information that can provide means for creating a rendering of the information in a contact-based user interface. The capture storage 111 may store information from the sensors 105, identification platform 109, content provider 117, and/or services platform 113 as processed through the identification platform 109 for the user to access at a later date.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the identification platform 109 and the content provider 117 to supplement or aid in the processing of the content information.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the identification platform 109 with travel information of the one or more geo-routes and/or location anchors, etc.

The content provider 117 may provide content to the UE 101, the identification platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. By way of example, the content provider 117 may provide content that may aid in the processing of the content information associated with POI to determine a route for map panning purposes. In one embodiment, the content provider 117 may also store content associated with the UE 101, the identification platform 109, and the services 115 of the services platform 113. In another embodiment, the content provider 117 may manage access to a central repository of data, and offer a consistent, standard interface to data, such as a repository of users' navigational data content.

By way of example, the UE 101, the identification platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
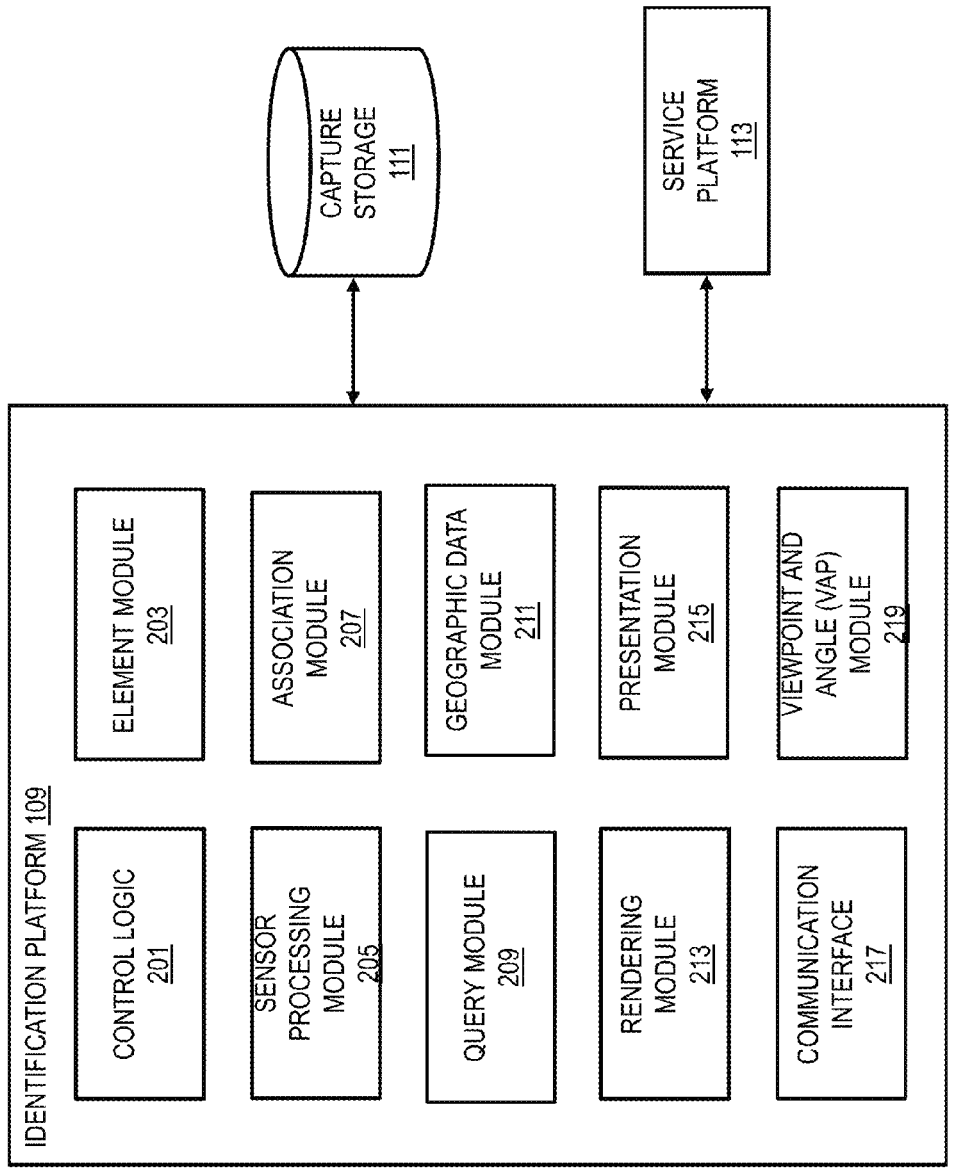
FIG. 2 is a diagram of the components of identification platform 109, according to one embodiment.

FIG. 2 is a diagram of the components of the identification platform 109, according to one embodiment. By way of example, the identification platform 109 includes one or more components for processing one or more images to determine camera location information and/or camera pose information, wherein these information are represented according to a global coordinate system, thereby causing, at least in part, an association of these information with the one or more images as meta-data information. It is contemplated that the functions of these components may be combined in one or more components or performed by other components of equivalent functionality. In this embodiment, the identification platform 109 includes control logic 201, element module 203, a sensor processing module 205, an association module 207, a query module 209, geographic data module 211, rendering module 213, presentation module 215 and communication interface 217.

The control logic 201 oversees tasks, including tasks performed by the element module 203, a sensor processing module 205, an association module 207, a query module 209, geographic data module 211, rendering module 213, presentation module 215 and communication interface 217. For example, although the other modules may perform the actual task, the control logic 201 may determine when and how those tasks are performed or otherwise direct the other modules to perform the task.

The element module 203 may work in conjunction with the sensors 105 to determine the element selected within an image. For example, the sensors 105 may detect a point in an image that has been selected by a user. The element module 203 may then determine an element within the image associated with the point selected by a user. In one scenario, sensors 105 may recognize a user touching a screen and selecting a point comprised of a number of pixels. Element module 203 may determine that the pixels touched are associated with a given element.

The sensor processing module 205 functions to determine related objects by processing sensor data from an imaging device, one or more other devices, or a combination thereof. Such sensor data may be transmitted via synchronization signals from one or more other devices. Furthermore, the sensor processing module 205 functions to determine, at least in part, at least one location, at least one tilt angle, at least one field-of-view, or a combination thereof of the at least one imaging device, the one or more other devices, or a combination thereof provided, in part, via sensors 105. Further, to determine related objects of one or more subjects, location information may be pre-determined and embedded in the image data.

By way of example, the image is associated with metadata for representing the one or more subjects or related objects depicted in an image. In addition, one or more user or auto-generated tags may be packaged as metadata for association with the image. The association module 207 may function by creating collections of multiple images. Further, information derived from transmitted signals from one or more other devices may be associated with images. In some embodiments the association module 207 derives data from information posted, stored, published, featured or otherwise broadcast to one or more subscribers of a service, i.e., a social networking, location service, online map service, or a combination thereof. In a further embodiment, the association module 207 provides information from determined candidate objects and inputs specifying the at least one object from among one or more candidate object. In another further embodiment, the association module causes an association between at least one image and queried information related to an environment depicted in the at least one image, wherein the information includes real-time information, historical information, or a combination thereof.

The query module 209 queries for information related to an environment depicted in the captured image, wherein the information includes real-time information, historical information, or a combination thereof. Query module 209 function to effectuate a query via communication network 107 of any available network component, including, but not limited to one or more available UE 101, content provider 117a, services platform 113, or a combination thereof. In an exemplary situation, query module 209 queries data including information posted, stored, published, featured or otherwise broadcast to one or more subscribers of a service, i.e., a social networking or location service. By way of example, query module 209 queries data via any offline or hosted/online applications or services for storing and sharing event information, utilizing information derived from captured data (e.g., image data, audio data, video data, etc.). In one embodiment, the query module 209 may query one or more photographs exposure set-up parameters, such queried information may be provided to the presentation module 215 whereby the queried information may be presented in the user interface.

The geographic data module 211 manages and controls determination of location information associated with the identified element. The geographic data module 211 may obtain this location information in a variety of ways. In one embodiment, the geographic data module 211 may employ a map application to determine the location information. In one scenario, the geographic data module may determine a model of an element, identify the element by matching the element to the model, and then determine the location information from data offered by the model. In a further embodiment, the geographic data module 211 may use image recognition to identify the element chosen, and then find location information associated with the identity.

In another embodiment, the geographic data module 211 may employ a more interactive method of prompting the user to select an image tied more closely to the element. From there, geographic data module 211 may use a map application such as an online map application to determine location information of the element. More specifically, the location can be determined by a triangulation system such as a GPS system, assisted GPS (A-GPS), wireless local area network triangulation, or other location extrapolation technologies. Standard GPS and A-GPS systems can use satellites to pinpoint the location (e.g., longitude, latitude, and altitude) of the element. GPS coordinates can provide finer detail as to the location of the element.

Alternately, geographic data module 211 may determine the location information of one or more elements using an overlaid city map, and mapped to the location depicted. By matching the city map overlay with the location selected, location information may be found. In one embodiment, to determine the location information of one or more elements, locations may be pre-determined and embedded in the image data. In one embodiment, selecting an element within an image may directly retrieve location information. In one scenario, the possible use of the magnetometer (compass) integrated in a device can help in determining the direction the user is facing and thus help match the city map overlay with the location selected.

Once the element's location information has been determined by the geographic data module 211, the rendering module 213 may determine preferences from, at least in part, users, content provider 117, the services platform 113, or some combination thereof. In one embodiment, content provider 117 and/or the services platform 113 may specify that elements with associated location information be demarcated so that users can clearly see where location information is available. In one scenario, demarcation may take the form of highlighting the elements that are available for selection by the user. In a further embodiment, the rendering module 213 may work with the element module 203 to determine the portions of the image that constitute the element so that the rendering module 213 may know where to highlight the image. In one scenario, rendering may be the last major step, giving the final appearance to animation. Given the geocoordinate-tagged video data from the coordinate tagging engine, the video can be rendered either in the server side or the client side. The geocoordinate-tagged video data gives the users the camera parameters (e.g., pose, focal length) for each frame or selected frames (e.g., one frame of every 60 frames), hence any standard augmented reality rendering technique can be used.

The presentation module 215 may control the display of a user interface as dictated by specifications drawn from the rendering module 213. In one embodiment, the rendering module identifies preferences as to what to display, while the presentation module 215 executes the creation of a user interface in accordance with the preferences. For example, once the rendering module 213 determines portions of an image to highlight, the presentation module 215 may create the highlighted image on a user interface for the user to interact with. In another embodiment, the presentation module 215 may further create a rendering of location information as selected by the user, and possibly offer further details on location information for the user to pick.

The communication interface 217 manages and controls any incoming and outgoing communication such as image and element analysis, data sharing, receiving various requests for location information and/or renderings of the location information from other UEs 101 or the content provider 117, services platform 113, and/or the services 115. The communication interface 217 can also manage other communications of the UE 101 such as internet communications. For example, as discussed above, the rendering module 213 may retrieve element information from the element module 203 and geographic data module 211, via the communication interface 217, in order to render images with selectable elements highlighted. The UE 101 may also be connected to storage media such as the capture storage 111 such that the identification platform 109 can access or store communication history data. By way of example, if the capture storage 111 is not local, then it may be accessed via the communication network 107.

In one embodiment, the viewpoint and angle (VAP) module 219 may cause at least one determination of popularity information associated with camera location information and/or camera pose information based, at least in part, on the information from the services platform 113. In one embodiment, the VAP module 219 may co-ordinate with the presentation module 215 to cause a presentation of the one or more representation of the popularity information in the at least one user interface of the at least one camera, thereby providing instant guidance to nearby popular viewpoints and camera angles. In one embodiment, the VAP module 219 may further determine and cause a presentation of the one or more representative images associated with the camera location and/or the camera pose information to assist the users of the UE 101 in finding the most suitable camera position.

Figure 3:
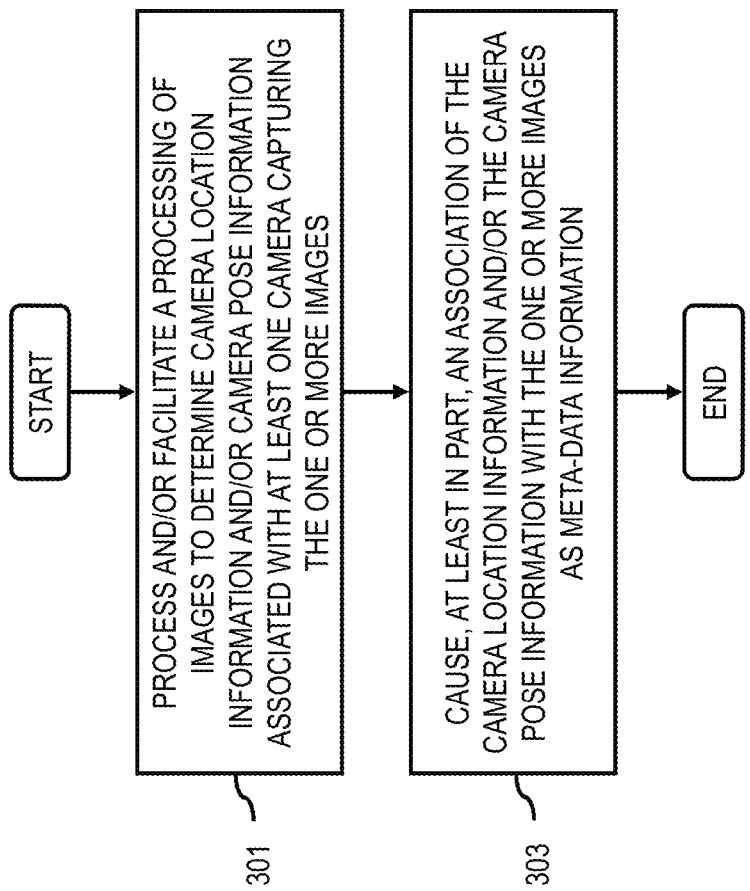
FIGS. 3-8 are flowcharts for processing one or more images to determine camera location information and/or camera pose information, wherein these information are represented according to a global coordinate system, thereby causing, at least in part, an association of these information with the one or more images as meta-data information, according to various embodiments.
Figure 30:
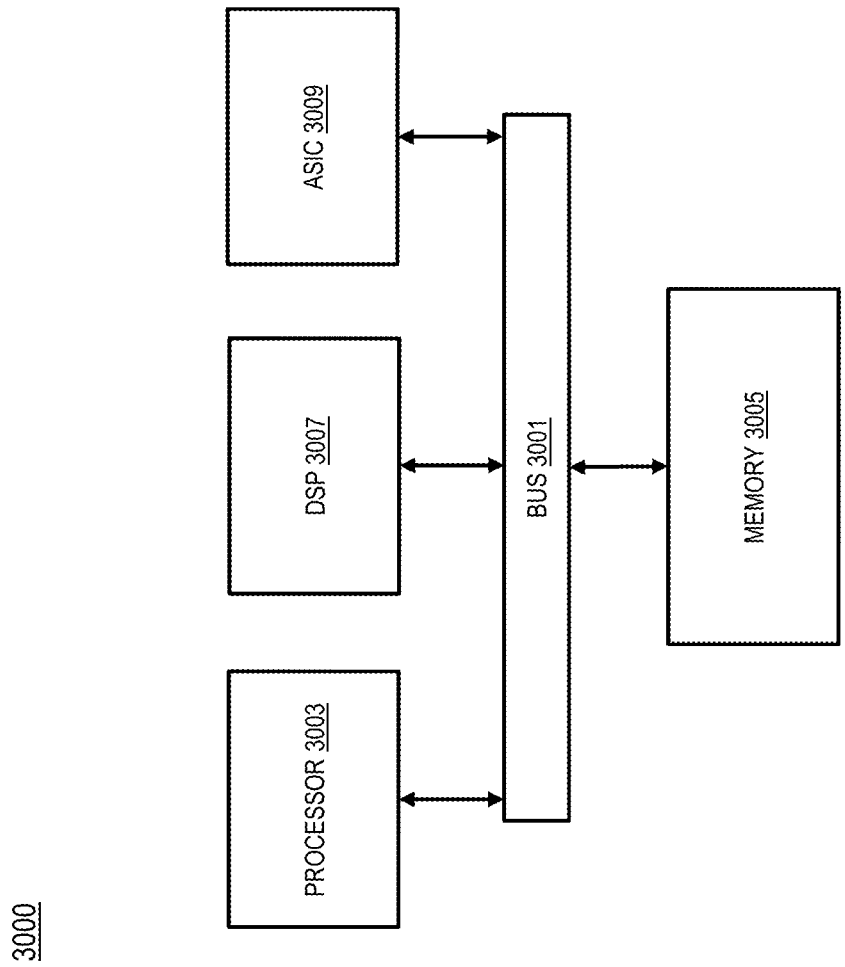
FIG. 30 is a diagram of a chip set that can be used to implement an embodiment of the invention.

FIG. 3 is a flowchart for processing one or more images to determine camera location information and/or camera pose information, wherein these information are represented according to a global coordinate system, thereby causing, at least in part, an association of these information with the one or more images as meta-data information. In one embodiment, the identification platform 109 performs the process 300 and is implemented in, for instance, a chip set including a processor and a memory as shown in FIG. 30.

In step 301, the identification platform 109 processes and/or facilitates a processing of one or more images to determine camera location information, camera pose information, or a combination thereof associated with at least one camera capturing the one or more images, wherein the camera location information, the camera pose information, or a combination thereof is represented according to a global coordinate system. In one embodiment, wherein the global coordinate system includes, at least in part, a global ECEF Cartesian coordinate system, a world geodetic system (WGS84) coordinate system, a universal transverse Mercator (UTM) coordinate system, or a combination thereof. As previously noted, the example embodiments described herein are applicable to any global coordinate system and it is contemplated that embodiments of the system 100 apply equally to ECEF, WGS84, UTM, and the like. By way of example, like ECEF, a WGS 84 coordinate system provides a single, common, accessible 3-dimensional coordinate system for geospatial data collected from a broad spectrum of sources. WGS 84 is geocentric, whereby the center of mass is being defined for the whole Earth. Similarly, a UTM coordinate system is a global coordinate projection system using horizontal position representation. In one embodiment, UTM is used to identify locations on the earth independently of vertical position, and is not a single map projection. In one embodiment, one or more images are part of the at least one video sequence, causing at least in part, a selection of the one or more images from among one or more frames of the at least one video, wherein the one or more images represent, at least in part, a subset of the one or more frames. In one scenario, a user may be looking for ABC museum within an image of New York City. The identification platform 109 may then determine data associated with the one or more images from one or more frames to give an accurate depiction of ABC museum in New York City. In another embodiment, one or more other images are further determined based, at least in part, on one or more contextual criteria, and wherein one or more contextual criteria include, at least in part, one or more temporal criteria. In one scenario, the identification platform 109 may determine images captured at different time representing one or more contextual criteria, for instance, time stamps, seasons, weather etc.

In step 303, the identification platform 109 causes, at least in part, an association of the camera location information, the camera pose information, or a combination thereof with the one or more images as meta-data information. In one scenario, the identification platform 109 may take into consideration for the camera pose information, the physical position of a camera in the space and the differences in the lens that affects the field of view of the camera.

Figure 4:
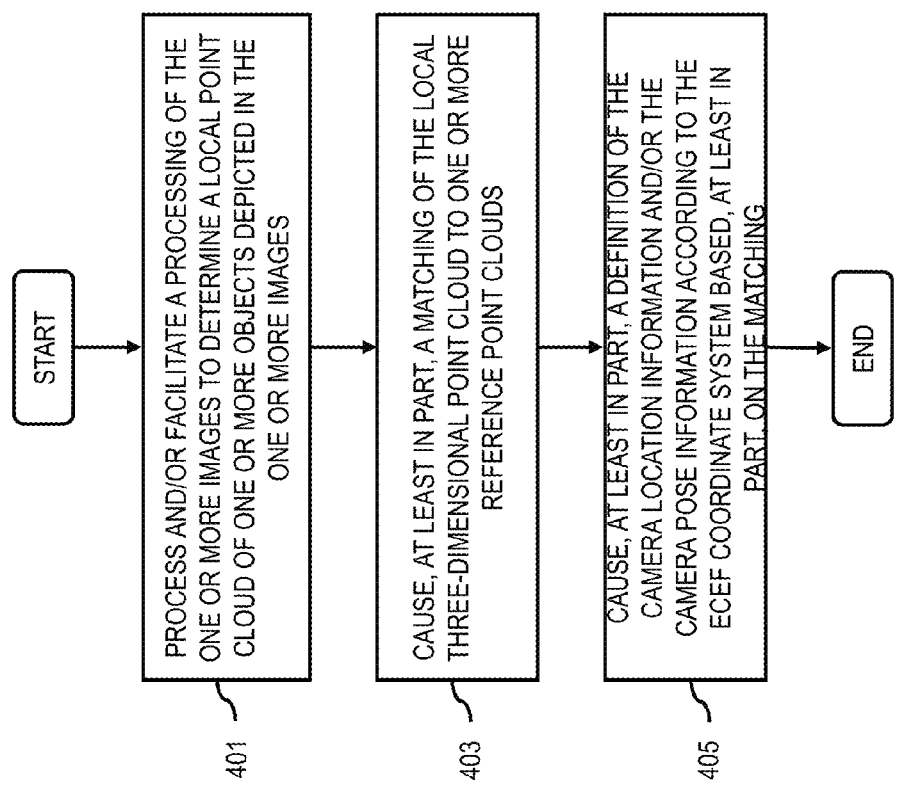

FIG. 4 is a flowchart of a process for defining camera location information and/or the camera pose information according to the global coordinate system based on the matching of the local three-dimensional point cloud to one or more reference point clouds. In one embodiment, the identification platform 109 performs the process 400 and is implemented in, for instance, a chip set including a processor and a memory as shown in FIG. 30.

In step 401, the identification platform 109 processes and/or facilitates a processing of the one or more images to determine a local point cloud of one or more objects depicted in the one or more images.

In step 403, the identification platform 109 causes, at least in part, a matching of the local three-dimensional point cloud to one or more reference point clouds. In one scenario, the identification platform 109 may use standard algorithm for creating a point cloud and then match the point cloud to the existing data to get the coordinate system for image processing, thereby converting 2D images into 3D pictures. In one scenario, there may be two potential matches in the same area, the identification platform 109 may resolve such potential conflict in the matching by using GPS location information, other sensor information, geo tags information etc.

In step 405, the identification platform 109 causes, at least in part, a definition of the camera location information, the camera pose information, or a combination thereof according to the global coordinate system based, at least in part, on the matching.

Figure 5:
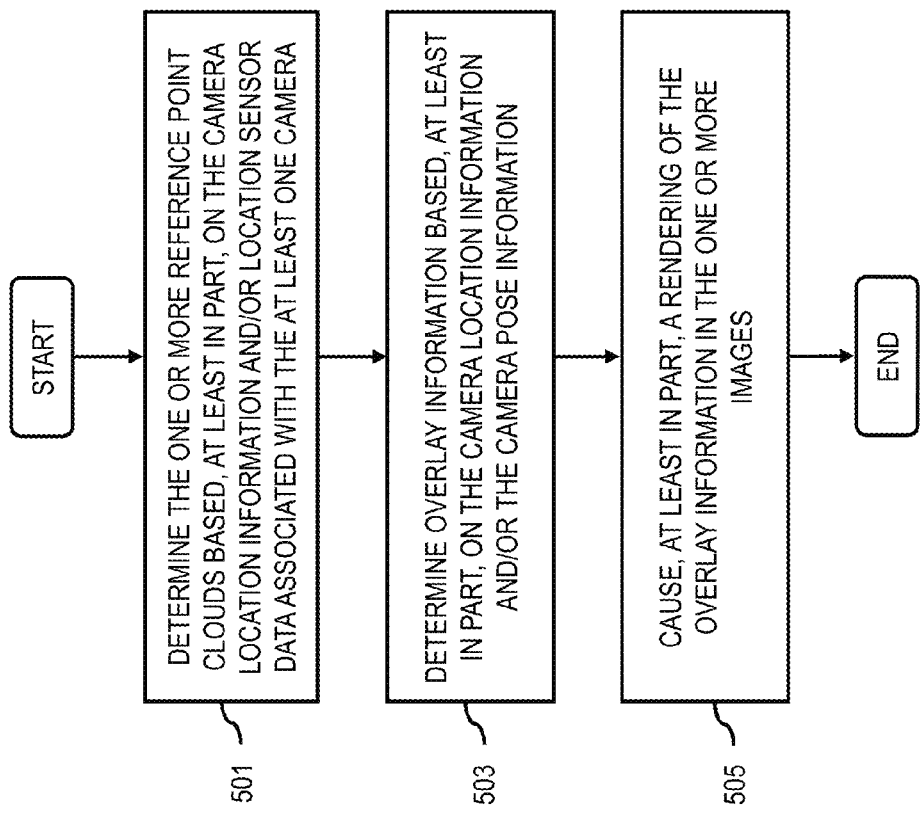

FIG. 5 is a flowchart of a process for determining the one or more reference point clouds and overlay information. In one embodiment, the identification platform 109 performs the process 500 and is implemented in, for instance, a chip set including a processor and a memory as shown in FIG. 30.

In step 501, the identification platform 109 determines the one or more reference point clouds based, at least in part, on the camera location information, location sensor data, or a combination thereof associated with the at least one camera.

In step 503, the identification platform 109 determines overlay information based, at least in part, on the camera location information, the camera pose information, or a combination thereof, wherein the overlay information includes, at least in part, point-of-interest information, social messaging information, location-based service information, or a combination thereof.

In step 505, the identification platform 109 causes, at least in part, a rendering of the overlay information in the one or more images. In one scenario, the videos may be rendered either in the server side or the client side. In one scenario, augmented reality applications may render the augmented content on top of a live viewfinder view from the built-in camera of a device. The placement of the augmented content may be calculated based on the position and orientation of the device, which in turn are estimated from sensor inputs, for instance, GPS, compass, accelerometer, gyroscope etc. By substituting the geocoordinate-tagged video stream for the live viewfinder image and the ECEF-based camera pose for the sensor-derived camera pose, such augmented reality applications may be used to render the same content on top of a geocoordinate-tagged video stream. Instead of a live camera view, augmented reality applications uses previously captured panorama images and 3D models for its rendering. The geocoordinate-tagged video stream substitutes the panorama image and controls the virtual camera pose using the geocoordinate-tagged video data.

Figure 6:
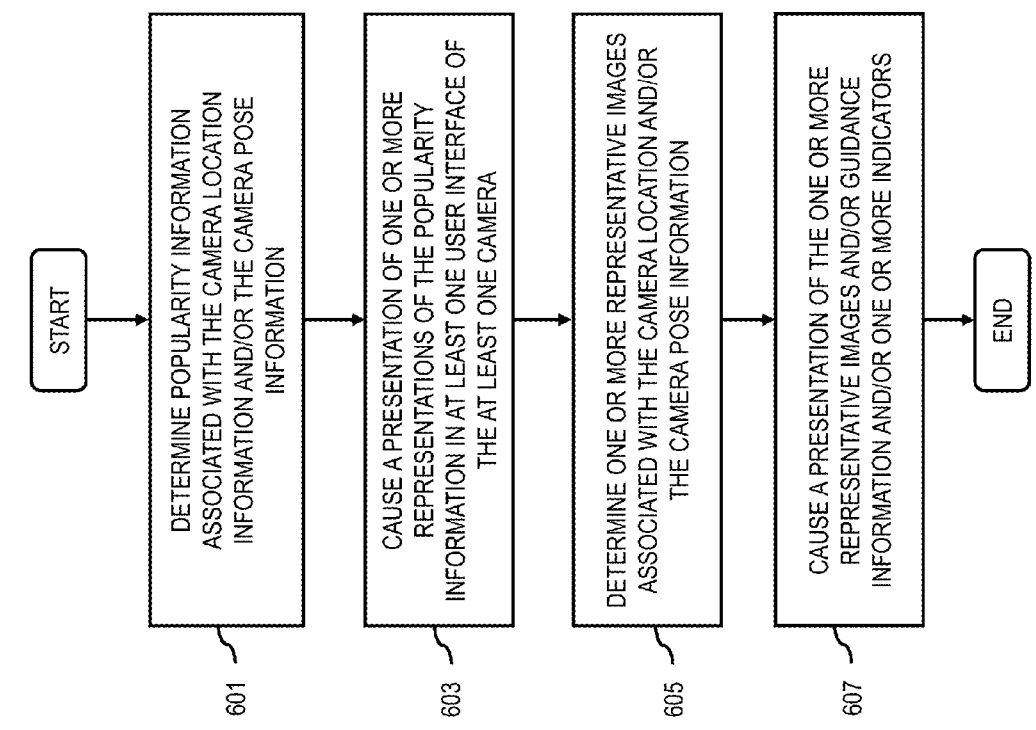

FIG. 6 is a flowchart of a process for determining popularity information and/or representative images, thereby causing a presentation of the one or more popularity information and/or representative images. In one embodiment, the identification platform 109 performs the process 600 and is implemented in, for instance, a chip set including a processor and a memory as shown in FIG. 30.

In step 601, the identification platform 109 determines popularity information associated with the camera location information, the camera pose information, or a combination thereof. In one scenario, the identification platform 109 may determine certain poses to be more favorable than others due to theirs aesthetic and/or practical values. Such determination may be based, at least in part, on the contextual information of one or more users. In one scenario, the identification platform 109 quantifies the popularity of the current camera pose, thereby causing one or more guides to the users of the UE 101 indicating, at least in part, a direction, an orientation, or a combination thereof for the at least one device.

In step 603, the identification platform 109 causes a presentation of one or more representations of popularity information in at least one user interface of the at least one camera. In one scenario, popularity information for at least one camera pose may be determined based, at least in part, on the number of photos taken from that angle and/or position, whereby the identification platform 109 may cause a rendering of the one or more guidance to the determined photo-taking spots in an augmented reality (AR) mode, for instance, VAP may provide users with instant guidance to the favorite photo-taking viewpoints and/or camera angles.

In step 605, the identification platform 109 determines one or more representative images associated with the camera location, the camera pose information, or a combination thereof. In one scenario, the identification platform 109 may select one or more pictures that are taken from the popular camera location and/or camera position for assisting users in their decision making process.

In step 607, the identification platform 109 causes a presentation of the of (a) the one or more representative images and/or (b) guidance information for navigating to one or more locations, for pointing the at least one camera to one or more targets, or a combination thereof associated with the one or more representative images and/or (c) one or more indicators for confirming that the at least one camera is at or near the one or more locations associated with the one or more representative images, pointing to the one or more targets, or a combination thereof. In one scenario, the identification platform 109 causes a display of representative images taken from popular camera positions, whereby users may be provided with instant guidance to popular photo-taking viewpoints by providing information on at least one camera angles and/or camera orientation and/or navigation information associated with the at least one representative image. In one scenario, at least one user may select one favorite camera shooting spot whereby a navigation step is invoked. Then, the identification platform 109 may provide the at least one user with proximity information on the at least one camera from the selected favorite camera shooting spot.

Figure 7:
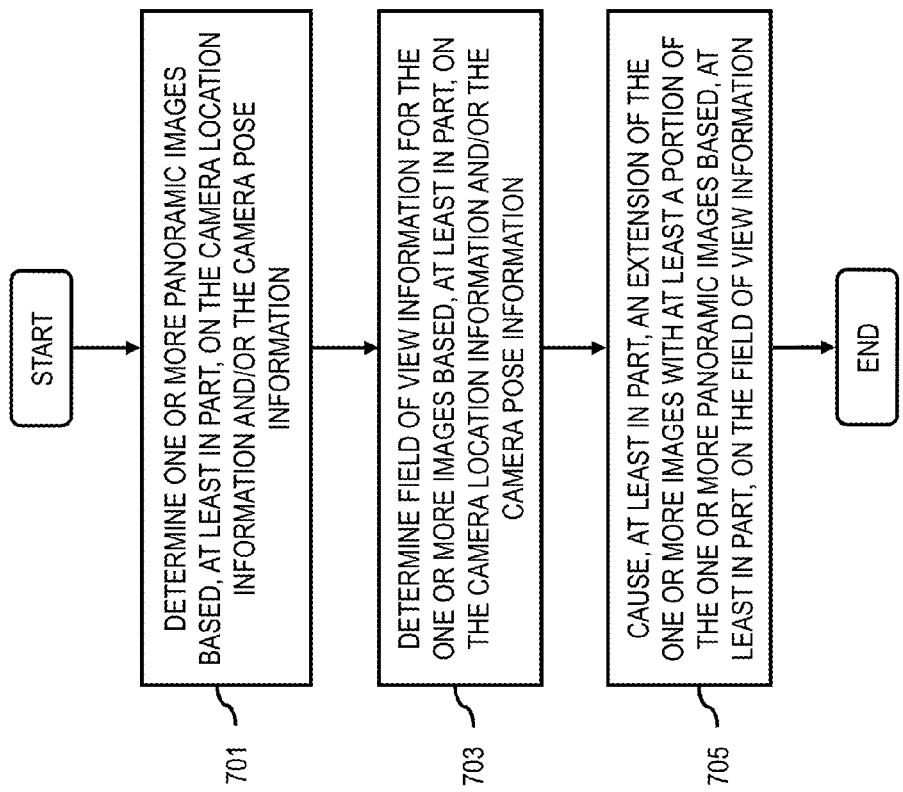

FIG. 7 is a flowchart of a process for determining one or more panoramic images and field of view information for the one or more images. In one embodiment, the identification platform 109 performs the process 700 and is implemented in, for instance, a chip set including a processor and a memory as shown in FIG. 30.

In step 701, the identification platform 109 determines one or more panoramic images based, at least in part, on the camera location information, the camera pose information, or a combination thereof. In one scenario, the identification platform 109 may process one or more images to determine a panoramic view of a captured environment. In one scenario, there may be several images of ABC museum from different users, the identification platform 109 may process these images associated with ABC museum based, at least in part, on camera location information and/or camera pose information, thereby generating a panoramic image for user convenience.

In step 703, the identification platform 109 determines field of view information for the one or more images based, at least in part, on the camera location information, the camera pose information, or a combination thereof. In one scenario, the identification platform 109 may recognize several images associated with POI and may determine the field of view based on the elements extracted from the recognized images. In one scenario, user takes a video of ABC museum from the eastern entrance of the museum, the user may interactively change the field of view to the indoor scenery of ABC museum by using panorama image taken inside the museum by other users.

In step 705, the identification platform 109 causes, at least in part, an extension of the one or more images with at least a portion of the one or more panoramic images based, at least in part, on the field of view information. In one scenario, multiple users may capture images of the same location at different time and from different angles, the identification platform 109 merges the images with the preexisting panorama, thereby providing an expansive POI view.

Figure 8:
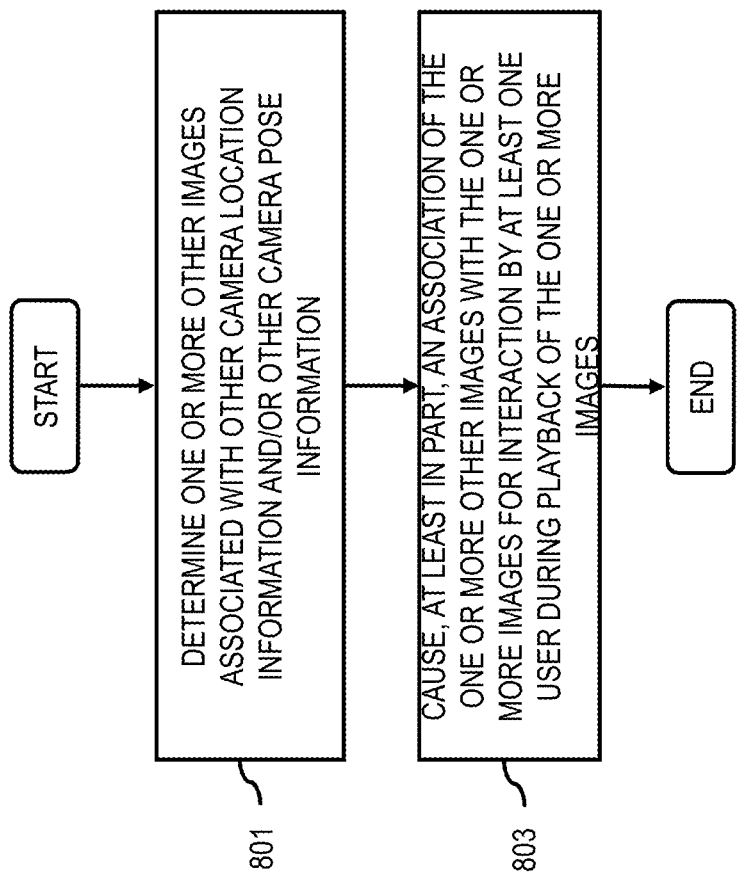

FIG. 8 is a flowchart of a process for determining one or more other images associated with other camera location information and/or other camera pose information, and causing an association. In one embodiment, the identification platform 109 performs the process 800 and is implemented in, for instance, a chip set including a processor and a memory as shown in FIG. 30.

In step 801, the identification platform 109 determines one or more other images associated with other camera location information, other camera pose information, or a combination thereof based, at least in part, on the camera location information, the camera pose information, or a combination. In one scenario, a user may want to visit ABC museum, since one or more images may be tagged with location information, the identification platform 109 may select one or more images associated with ABC museum. The identification platform 109 may further select images based, at least in part, on camera pose information, ensuring that the user gets a display of ABC museum from different angle, thereby allowing user images to be augmented with that of other users.

In step 803, the identification platform 109 causes, at least in part, an association of the one or more other images with the one or more images for interaction by at least one user during playback of the one or more images. In one scenario, a user may want information on ABC museum, the identification platform 109 may guide the user in manipulating one or more images, by providing one or more images in a user interface of at least one UE 101, to capture accurate depiction of ABC museum from different angles. The identification platform 109 may cause an association of the one or more images based, at least in part, on processing of sensor data, querying for information related to the environment depicted in a captured image, transmitted signal from one or more other devices, images captured from one or more other devices, or a combination thereof.

Figure 9:
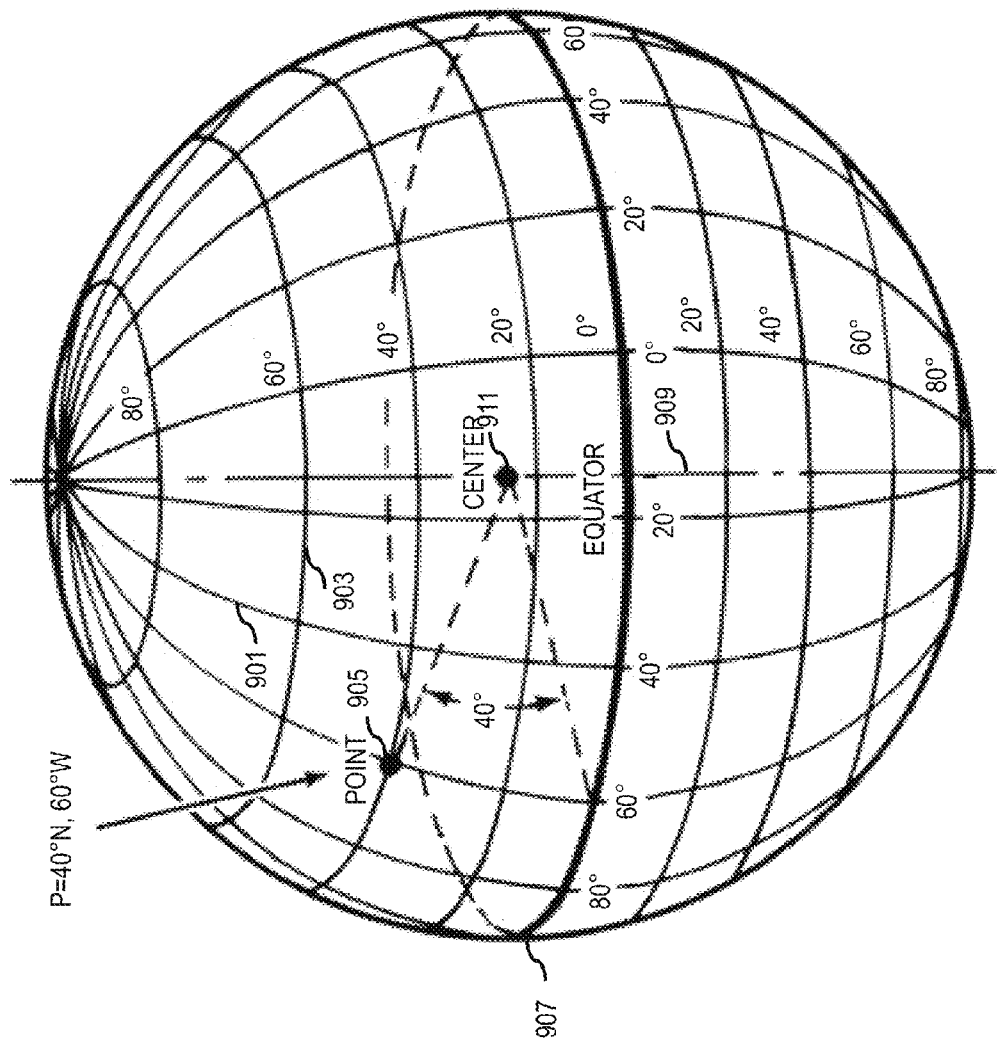
FIG. 9 is a diagram of elliptical model of the earth utilized in the process of FIGS. 3-8, according to one embodiment.

FIG. 9 is a diagram of elliptical model of the earth utilized in the process of FIGS. 3-9, according to one embodiment. The earth surface is often approximated by a spherical model as illustrated in FIG. 9. Latitude (901) and longitude (903) are geographic coordinates that respectively specify the north to south position and east to west position of a point on earth surface. Such two dimensional geographic coordinate system enables every location on earth to be specified by a pair of latitude (901) and longitude (903), for instance, diagram 907 presents an example of a point P (905) (N 40°, W 60°) in a 2D geographic coordinate system (GCS 2D). In one scenario, if the height (909) of a geographic location is of interest, a triple of latitude, longitude and altitude (or elevation) can be used to represent a location that resides below, on or above earth surface, for instance, N 40°, W 60°, H 100 meters, wherein the height is defined as the distance between the point in question and a reference geodetic datum. The choice of the actual reference datum is defined by the geodetic system under consideration. For instance, the commonly used World Geodetic system (WGS 94) uses an elliptical datum surface and Earth Gravitational Model 1996 (EGM 96) geo-id for this purpose.

Figure 10:
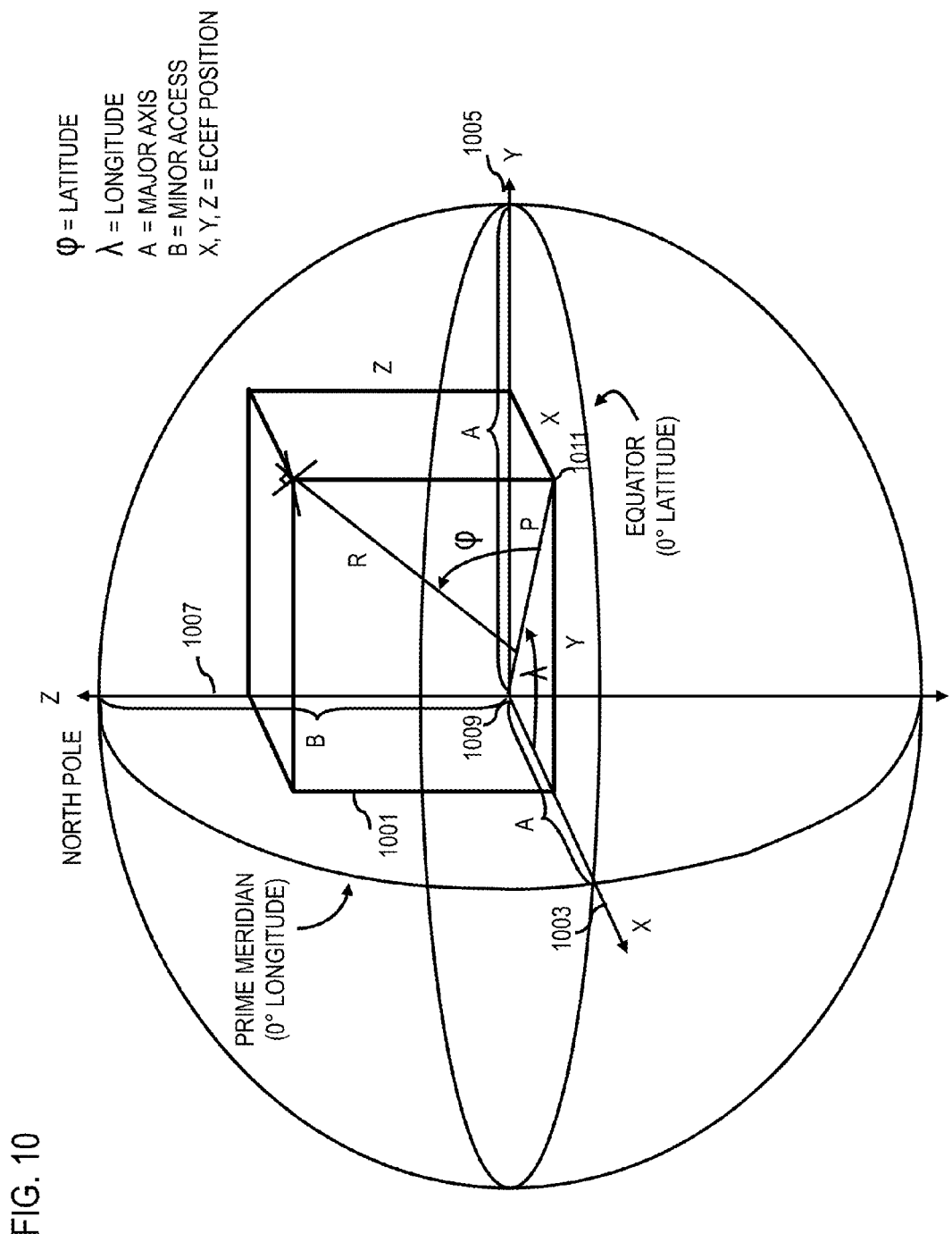
FIG. 10 is a diagram of an earth centered, earth fixed (ECEF) Cartesian coordinate system utilized in the process of FIGS. 3-8, according to one embodiment.

FIG. 10 is a diagram of an earth centered, earth fixed (ECEF) Cartesian coordinate system utilized in the process of FIGS. 3-8, according to one embodiment. A general Cartesian coordinate system for a three dimensional space (1001) is uniquely defined by its origin point and three perpendicular axis lines (X (1003), Y (1005), Z (1007))

meeting at the origin O (10010). A 3D point P (1011) is then specified by a triple of numerical coordinates ($X_p$, $Y_p$, $Z_p$), which are the signed distances from the point P to the three planes defined by two axes (Y-Z, X-Z, X-Y) respectively. In one scenario, the ECEF Cartesian coordinate system has its origin point (0,0,0) defined as the center of the mass of the earth, its X-axis intersects the sphere of the earth at 0°latitude (equator) and O° longitude and its Z-axis points towards the north pole, wherein a one to one mapping exists between ECEF and the geo-graphic co-ordination systems.

Figure 11:
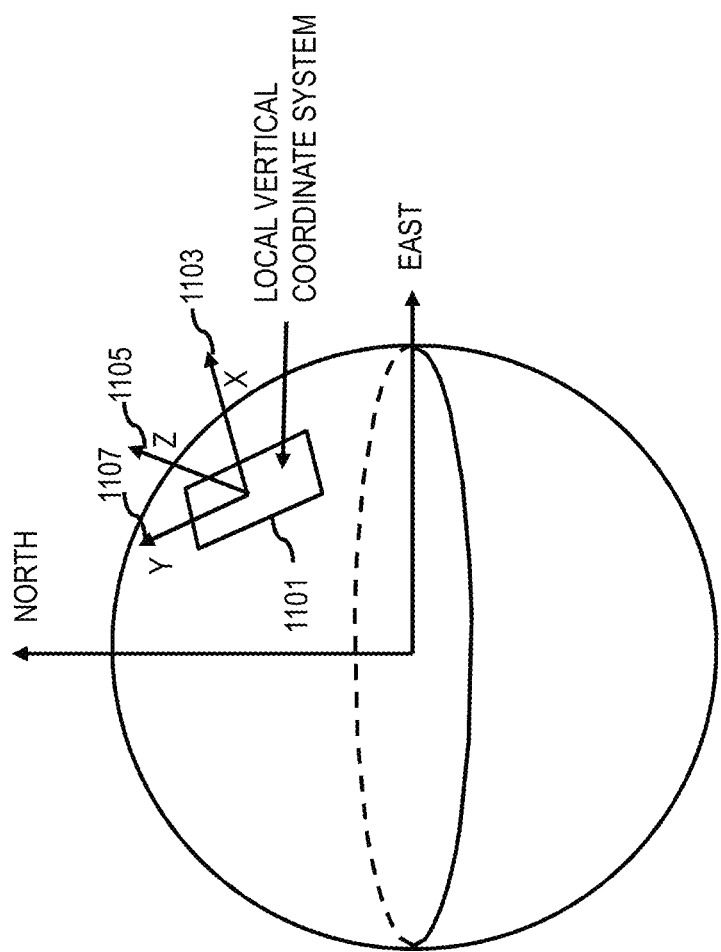
FIG. 11 illustrates a Cartesian coordinate system (CCS) 3D local system with its origin point restricted on earth and three axes (X-Y-Z) utilized in the process of FIGS. 3-8, according to one embodiment.

FIG. 11 illustrates a Cartesian coordinate system (CCS) 3D local system (1101) with its origin point restricted on earth and three axes (X (1103)-Y(1107)-Z(1105)) utilized in the process of FIGS. 3-8, according to one embodiment. A CCS_3D_local system is a Cartesian coordinate system that has its origin point restricted on earth surface. FIG. 11 is a representation of a 3D earth modeling, wherein a CCS_3D_local system is often used to represent a set of 3D geo-augmented data that are near to a reference point on earth, for instance, the 3D geo-augmented data may cover a limited space of 11 km, thereby making the co-ordinate system local. In one scenario, given the origin point and three axes of a CCS_3D_local system, there exists a unique transformation between the CCS_3D_ECEF and the local system in question. If the origin and three axes are unknown, it is difficult to map points in CCS_3D_local to CCS_3D_ECEF system.

Figure 12:
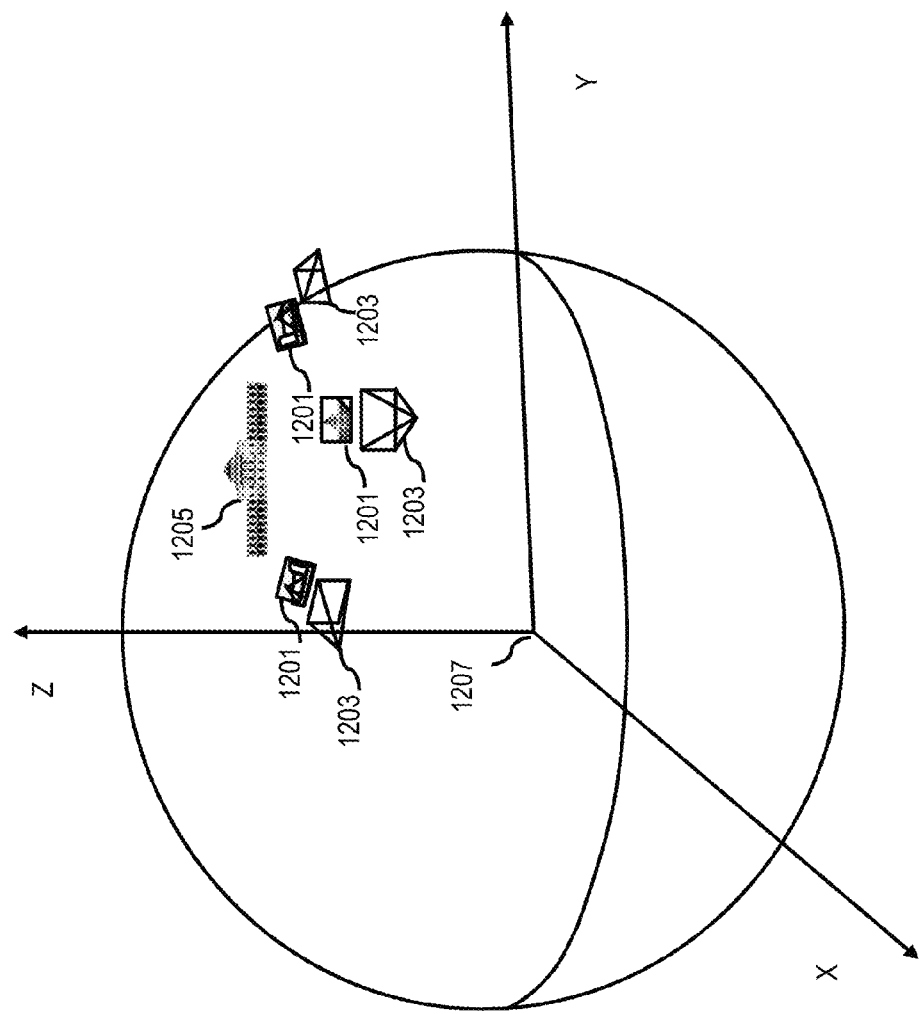
FIG. 12 is a diagram of a geo video data utilized in the process of FIGS. 3-8, according to one embodiment.

FIG. 12 is a diagram of a geo video data utilized in the process of FIGS. 3-8, according to one embodiment. In one embodiment, a complete geo video data, may consist of four items: 1) video frames (1201), 2) camera pose (1203), 3) a set of 3D points that are viewable from one or more multiple video frames (1205), and 4) an ECEF Cartesian coordinate system in which the three data items are defined (1207).

Figure 13:
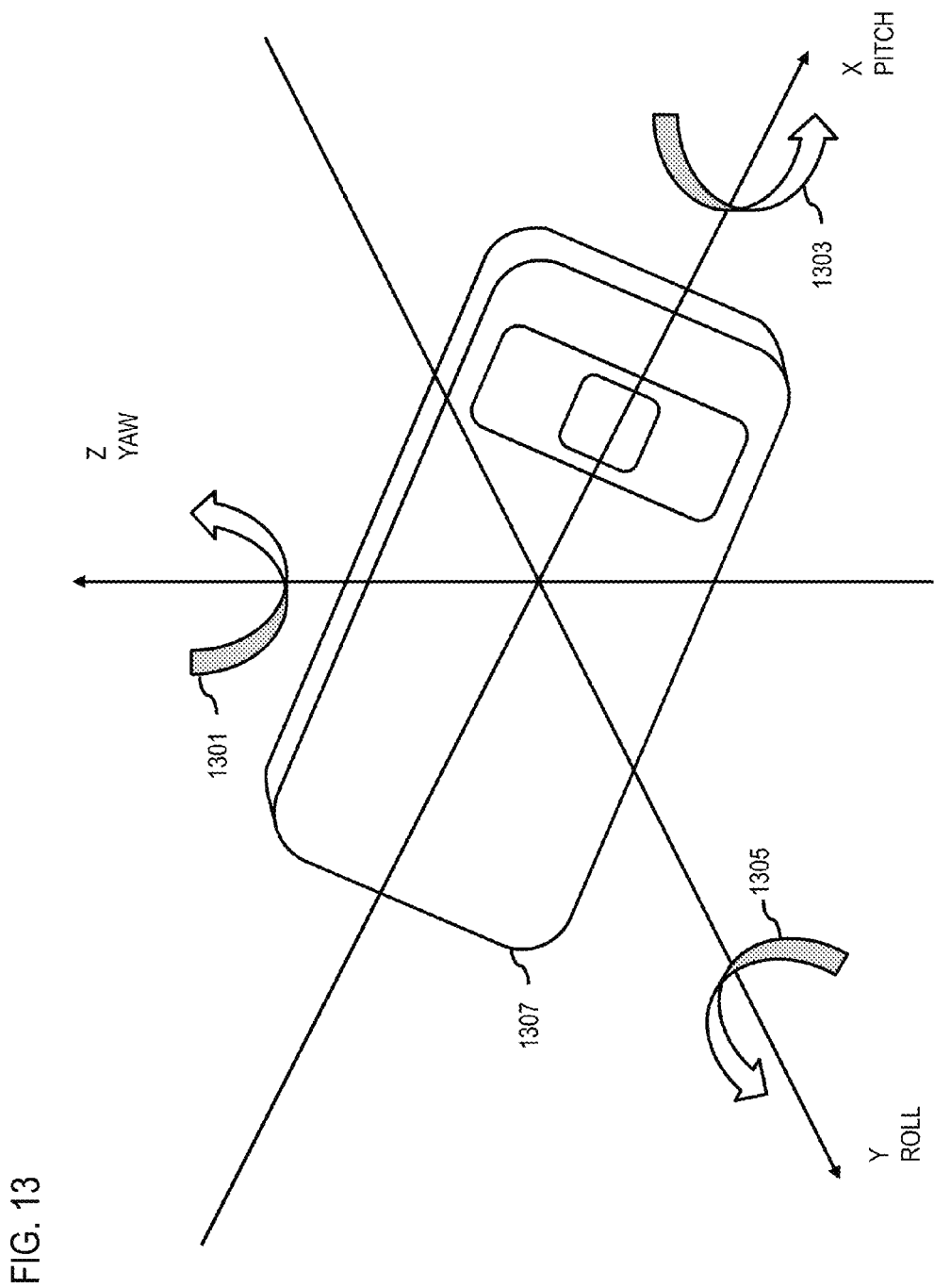
FIG. 13 is a diagram of a camera orientation in a 3D space utilized in the process of FIGS. 3-8, according to one embodiment.

FIG. 13 is a diagram of a camera orientation in a 3D space utilized in the process of FIGS. 3-8, according to one embodiment. Here, Yaw (1301) is a counterclockwise rotation along the z axis, Pitch (1303) is a counterclockwise rotation along the y axis, and roll (1305) is a counterclockwise rotation along the x axis. In one scenario, the video frames are often regarded as a sequence of still images that are captured (or displayed) at different time at varying camera locations. In one scenario, the camera pose of associated videos frames represent 3D locations and orientations of the video-capturing-camera at the time when the video frames were recorded. The camera locations can be simply described as $X_L$, $Y_L$, $Z_L$. The orientation can be described as roll, yaw and pitch angles of rotating the camera from a reference placement to its current placement. Further, the orientation can be represented by rotation matrices or quaternions, which are mathematically equivalent to Euler angles. With the camera location and orientation, one can define the camera movement with six degrees of freedom (6 DoF) in a coordinate system.

Figure 14:
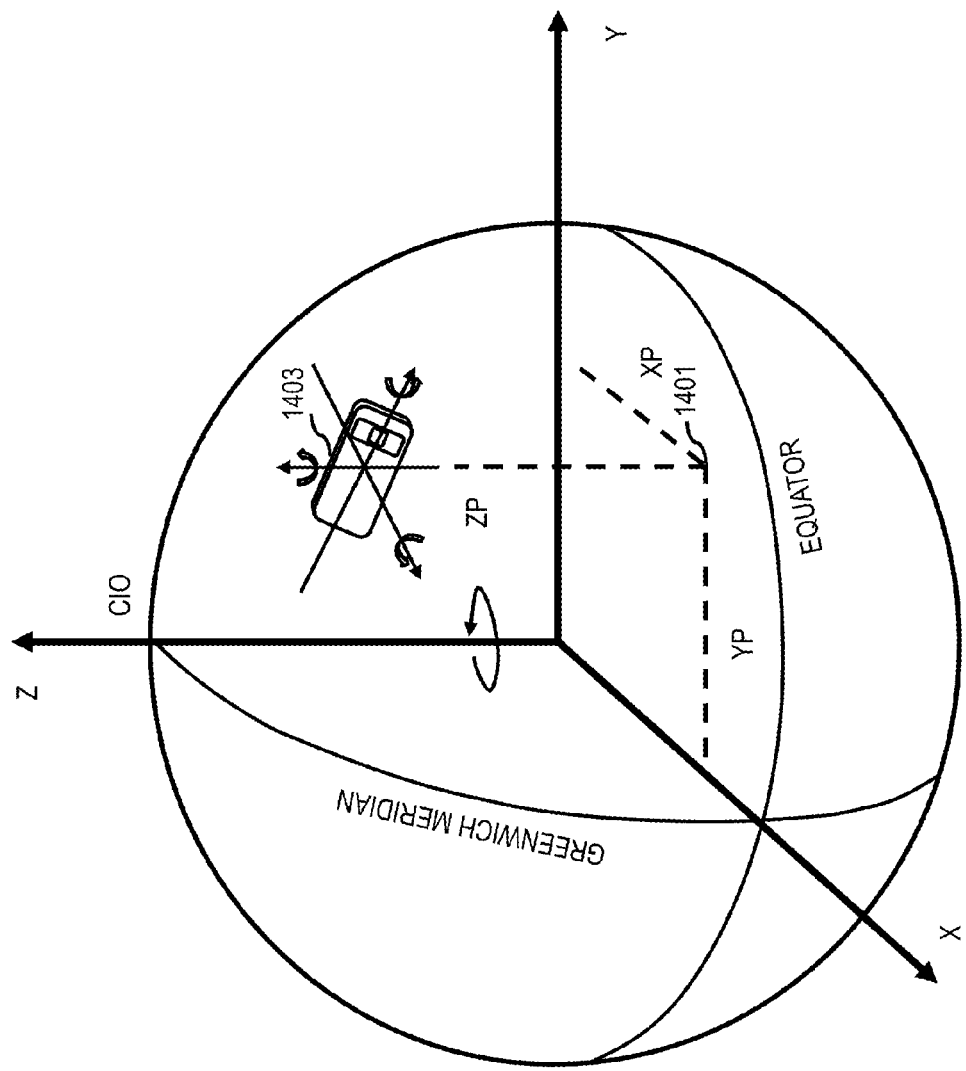
FIG. 14 is a diagram of a camera pose in CCS_3D_ECEF utilized in the process of FIGS. 3-8, according to one embodiment.

FIG. 14 illustrates an example of a camera pose in CCS_3D_ECEF utilized in the process of FIGS. 3-8, according to one embodiment. In one scenario, a point cloud is a set of 3D points that are viewable from one or more multiple video frames, when viewed from a given camera pose (1401), 3D points are projected, according to proper camera models, onto the 2D image and gives rise to color intensities at different pixel locations (1403). In the context of Earth modeling, 3D point clouds can be directly measured by Light Detection and Ranging (LIDAR) technology. Alternatively, 3D point clouds can be reconstructed from input video frames by using computer vision Structure-From-Motion (SFM) technology. Within CCS_3D_ECEF, 3D point clouds as well as camera poses needs to be accurately defined:

(1) When a CCS_3D_ECEF is used, the camera poses and the point clouds are globally defined.
(2) If a CCS_3D_Local system with known origin and axes is used, the camera poses and point clouds can be uniquely mapped to the CCS_3D_ECEF. By doing this, the camera pose is also defined in a global coordinate system. Besides, if a CCS_3D_Local system with unknown origin and axes is used, camera poses and point clouds can only be defined within the local coordinate system, because of the difficulty to map point-clouds and camera poses into CCS_3D_ECEF.

Figure 15:
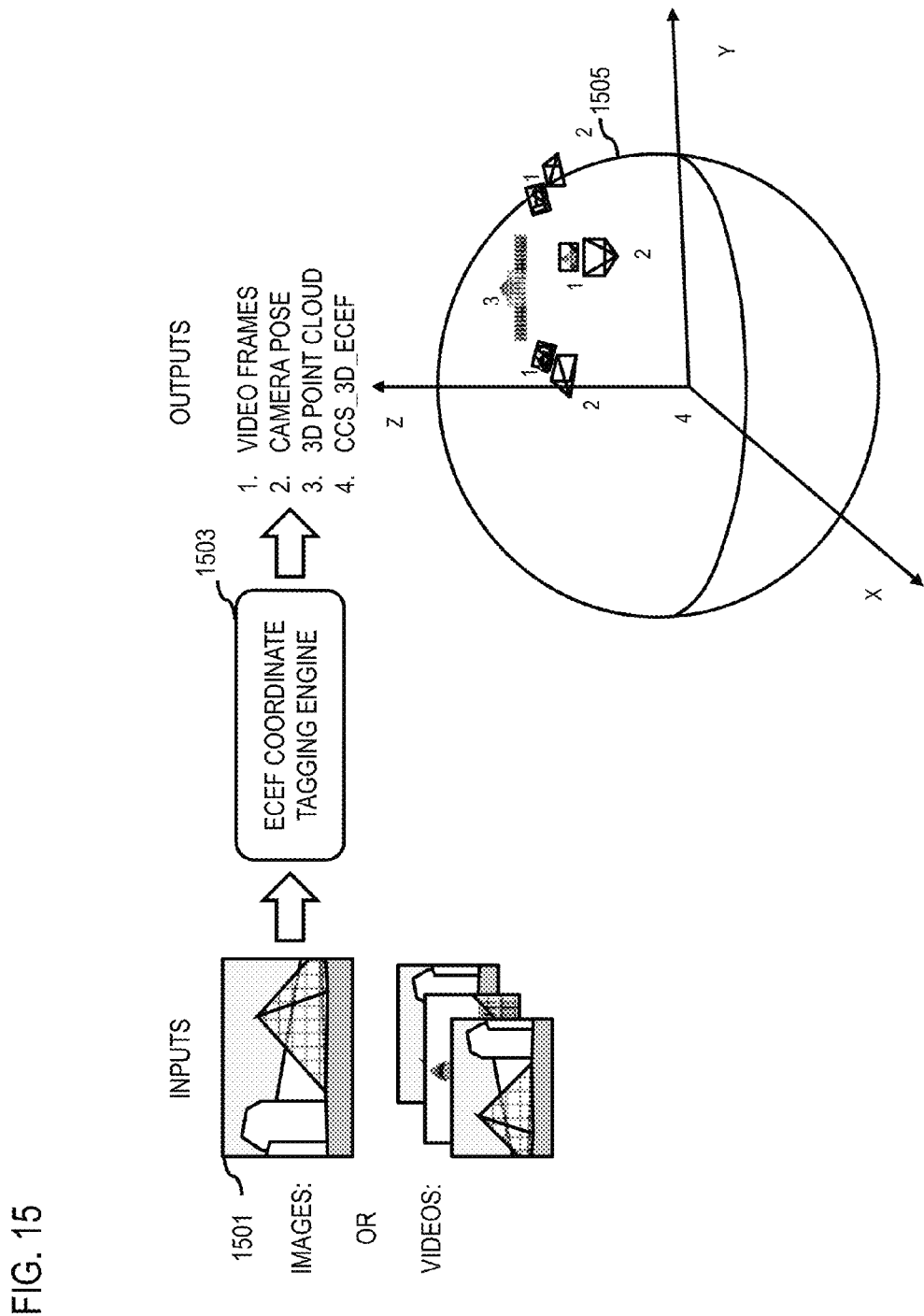
FIGS. 15-23 are diagrams of user interfaces utilized in the processes of FIGS. 3-8, according to various embodiments.

FIG. 15 is a diagram of user interface utilized in the process of FIGS. 3-8, according to one embodiment. FIG. 15 illustrates a general overview of the inputs and outputs of the ECEF coordinate tagging engine, wherein the engine extracts accurate geo-location metadata from input data. The input to the ECEF coordinate tagging engine can be either a collection of images or a sequence of video frames (1501). After processing, the engine outputs a set of geo-location metadata, including registered video frames, corresponding camera poses and reconstructed 3D point clouds (1503). All these data are defined within a CCS_3D_Local system with known origin and axes (1505). Therefore, camera poses and point clouds can be uniquely mapped to the CCS_3D_ECEF.

Figure 16:
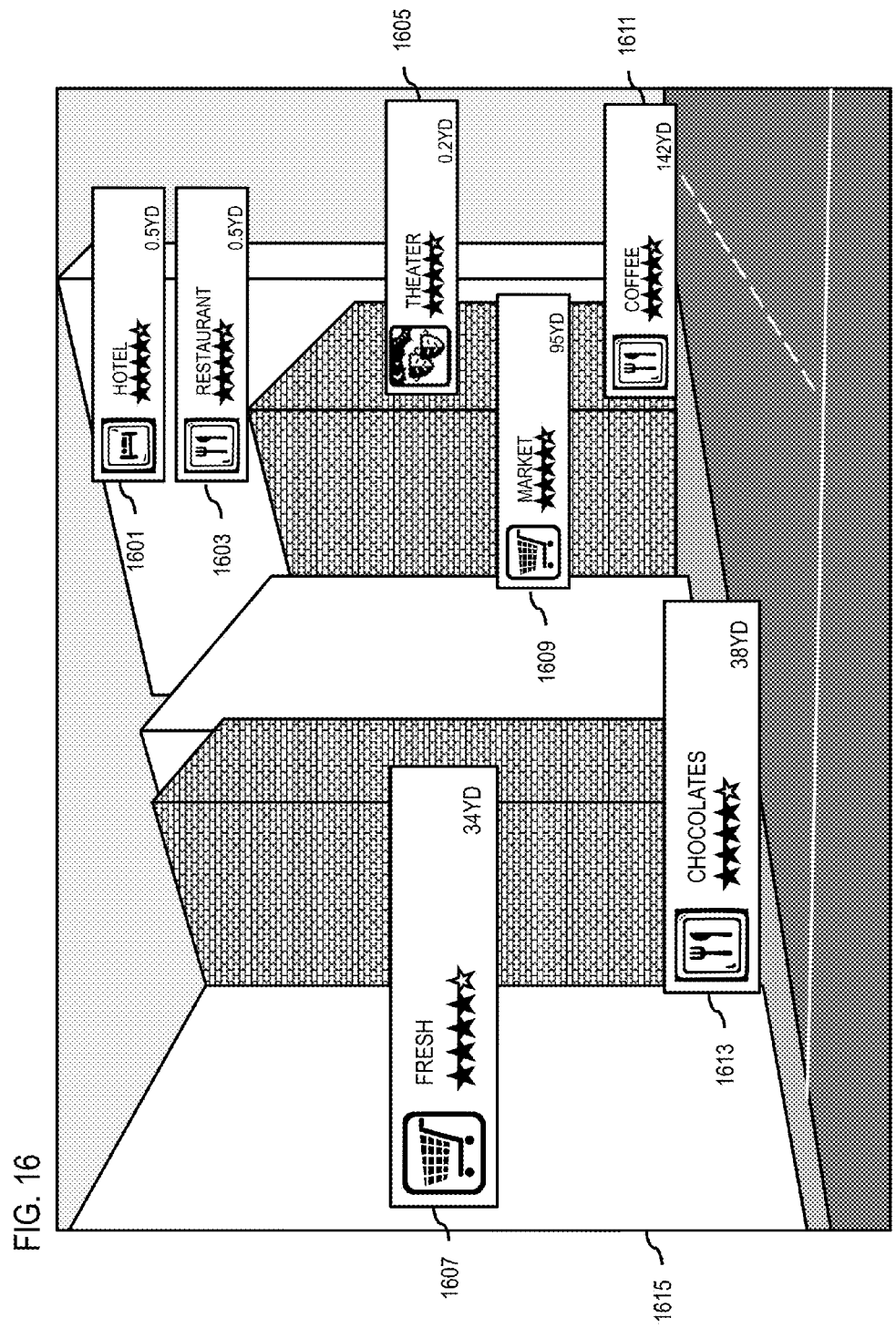

FIG. 16 is a diagram of user interface utilized in the process of FIGS. 3-8, according to one embodiment. FIG. 16 illustrates an example of the augmented video with POIs superimposed on video frames. In one scenario, based on POIs and associated geo metadata, it is possible to augment a geocoordinate-tagged video with nearby POIs data (1615). During the playback of a geocoordinate-tagged video, the change of camera poses gives rise to corresponding change in the rendered POI data, thus creating augmented-reality experience. The rendering of POIs may be associated with the playback of a recorded geocoordinate-tagged video, instead of the on-site camera viewfinder images. In one scenario, Peter visits XYZ shopping mall, and takes a video of the mall. Upon uploading the video, he would get a video with added POI information, for instance, the hotel (1601), the restaurant (1603), the theatre (1605), the market (1609) etc., within XYZ shopping mall, with reviews and distance information adhered to the display.

Figure 17:
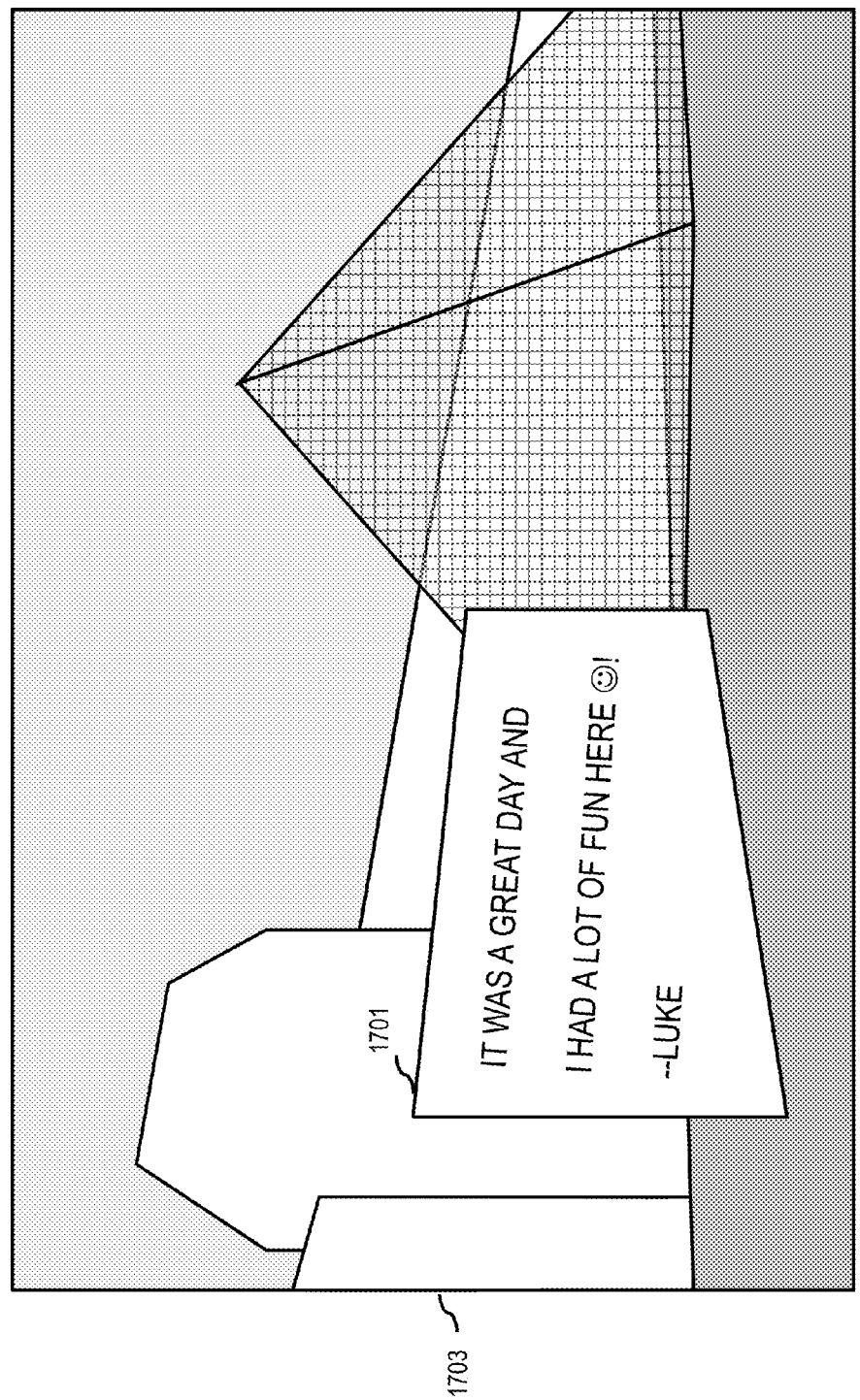

FIG. 17 is a diagram of user interface utilized in the process of FIGS. 3-8, according to one embodiment. FIG. 17 presents an example of a social virtual board in a video frame. In one scenario, social aspect of geocoordinate-tagged videos is a unique feature that allows sharing of a geocoordinate-tagged video (and POIs) among friends or people of interest. In one scenario, certain virtual objects, for instance, a virtual board, may be rendered accordingly during the playback of a geocoordinate-tagged video (1703). Such a virtual board can be used to leave comments among friends. In one scenario, Mike goes to Paris, visits a museum, and takes a video. After he uploads the video together with his comments of the trip, he would get a video with added virtual social board where his feeling of the trip is added (1701). If Mike shows the video to his friends, they can see Mike's comments about the trip and also leave their comments on the board. Further, the augmented video is rendered with the calculated camera pose for each image, instead of rough sensor data, resulting in more accurate rendering.

Figure 18:
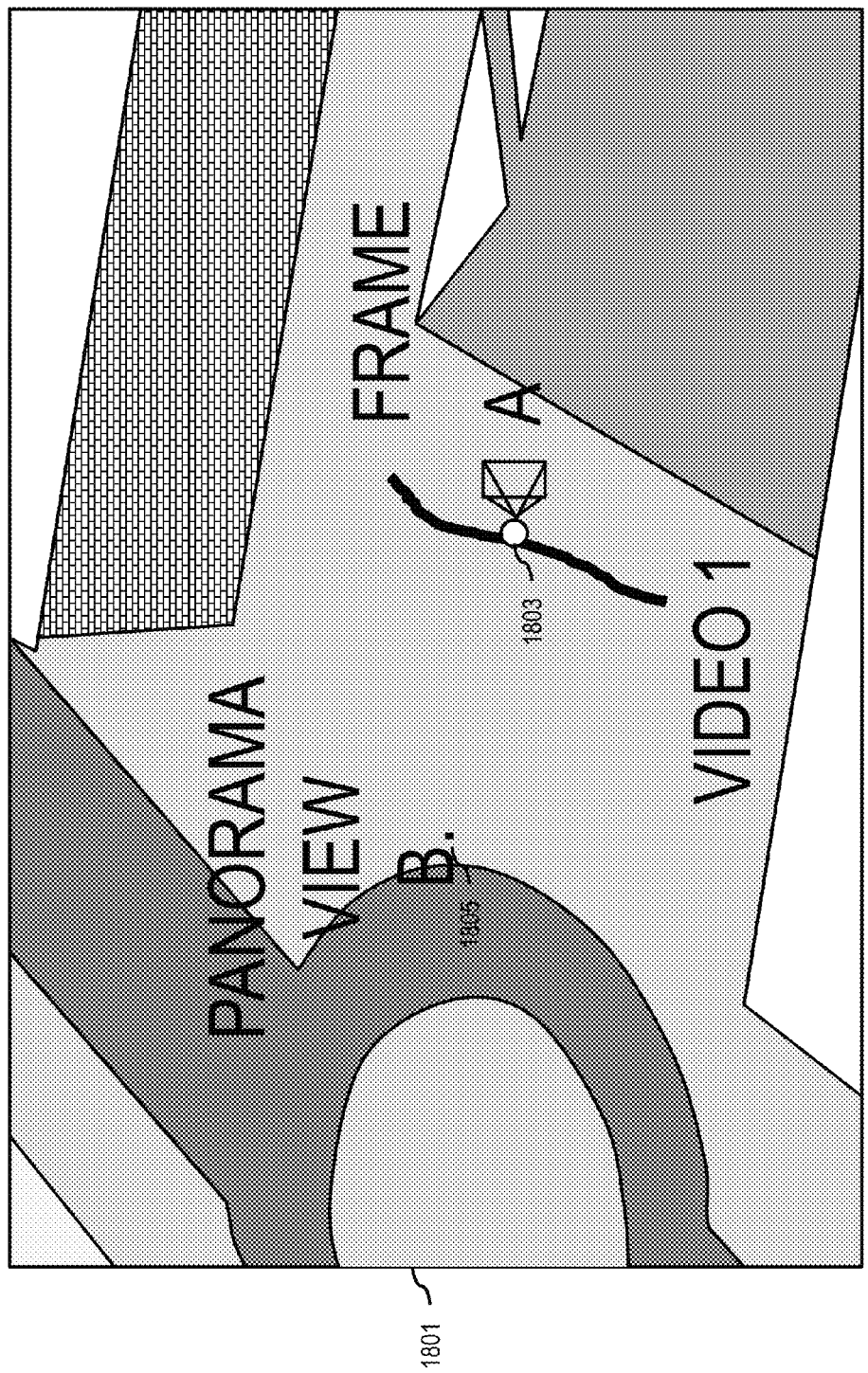

FIG. 18 is a diagram of user interface utilized in the process of FIGS. 3-8, according to one embodiment. FIG. 18 presents an example of switching from a video frame A to the panorama view B during the playback of the video 1. In one scenario, panorama images are often tagged with GPS information (i.e. latitude and longitude in GCS_2D). Based on panorama image geo-location information, it is possible to augment geocoordinate-tagged video with nearby panorama images. During the playback of a geocoordinate-tagged video, the field of view (FOV) of every video frame can be extended to 360° by using nearby panorama images (1801). In one scenario, the FOV of frame A is limited to the entry of ABC museum (1803). Therefore, the viewers may interactively change the FOV to the opposite side by using panorama image taken at position B (1805).

Figure 19:
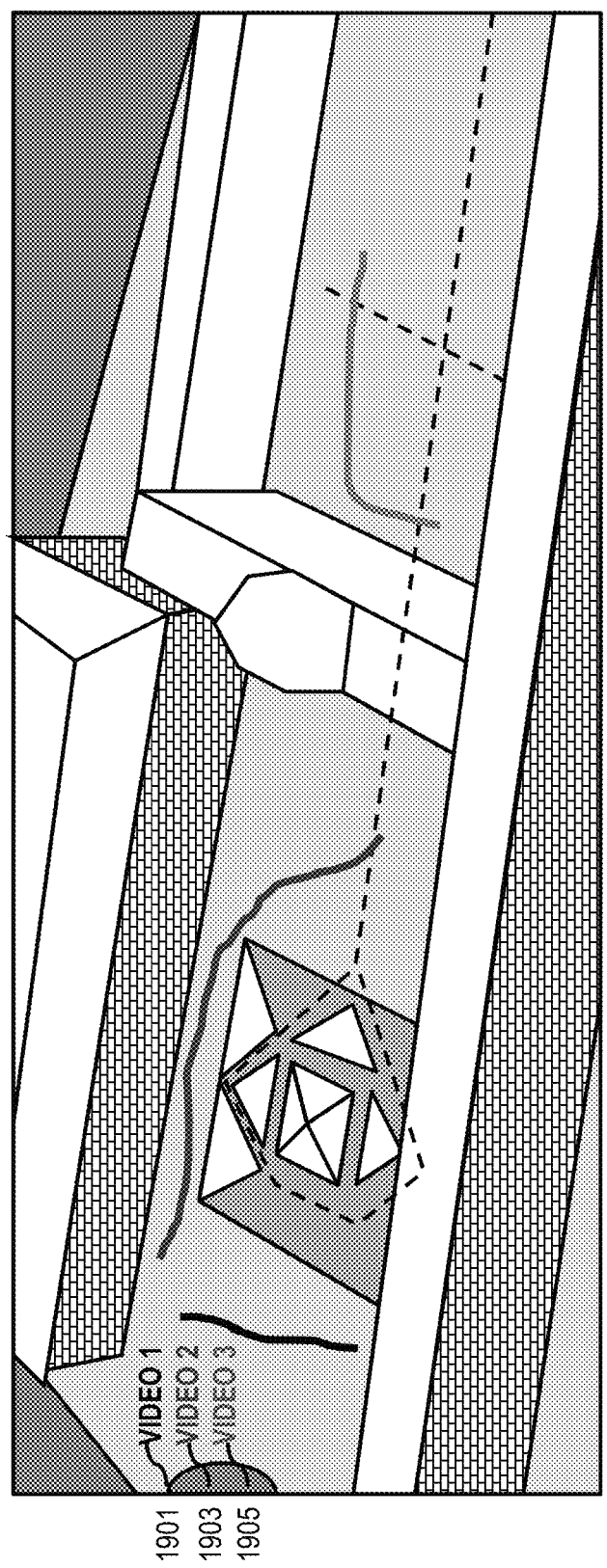

FIG. 19 is a diagram of user interface utilized in the process of FIGS. 3-8, according to one embodiment. FIG. 19 presents an illustration whereby three videos (1901, 1903, and 1905) are taken by three different users at different time and locations of POI. Since all geocoordinate-tagged video data can be reconstructed within the CCS_3D_ECEF system, it is possible to integrate nearby geocoordinate-tagged videos that are shot at different locations, time and by different people. During the playback of a geocoordinate-tagged video, the viewer may choose to switch from the current geocoordinate-tagged video to a nearby geocoordinate-tagged video. Both the path and the angle of the viewing camera can be interactively controlled by the viewer. In one scenario, there may be three videos with different capturing-camera-paths around ABC museum. During the playback of the "video 2" (1903), the user may choose to view frames from "video 1" (1901) or "video 3" (1905).

Figure 20A:
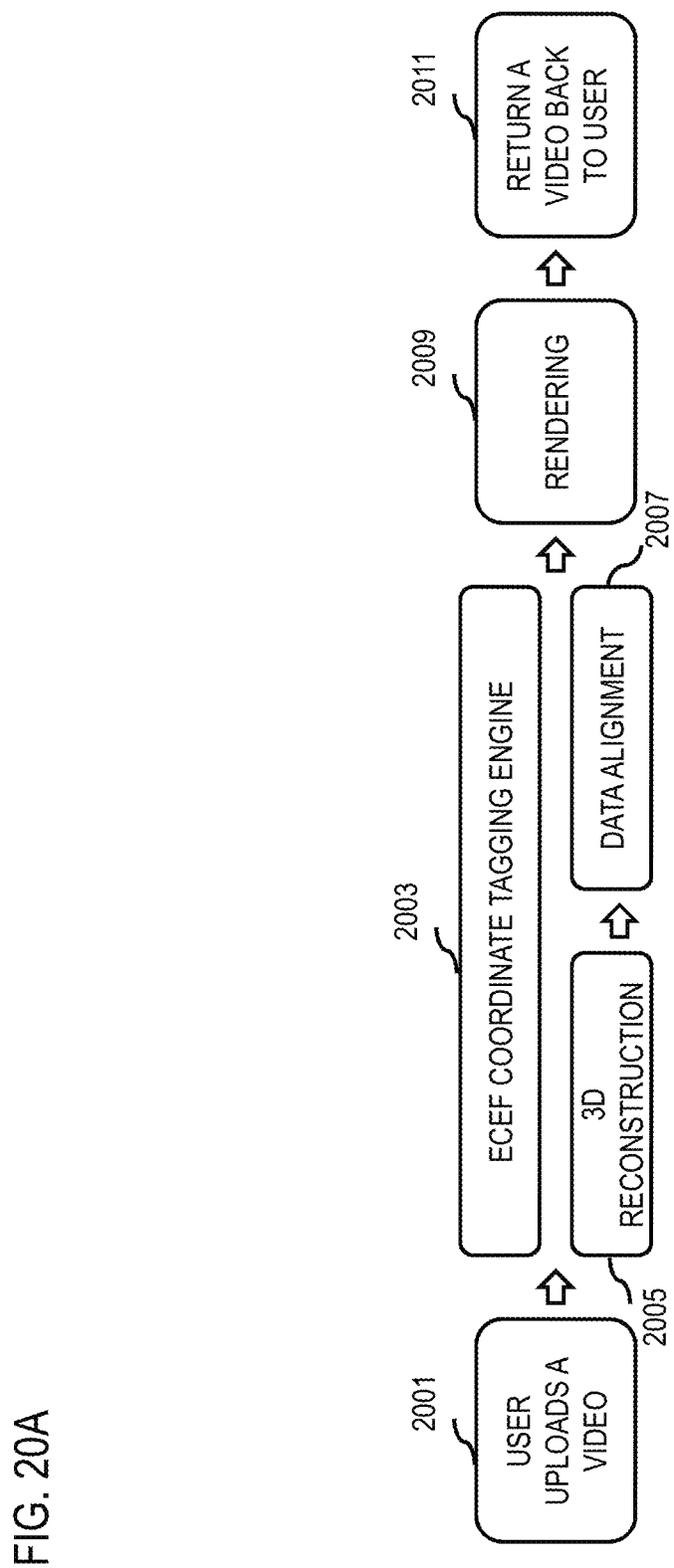

FIG. 20A is a diagram of user interface utilized in the process of FIGS. 3-8, according to various embodiments. FIG. 20A shows the pipeline of processing of images to determine camera location information and/or camera pose information associated with at least one camera capturing the one or more images. In one scenario, a user takes a video with his UE 101, the video is automatically uploaded to the ECEF coordinate tagging engine (2001), and then the ECEF coordinate tagging engine generates the geocoordinate-tagged video data (2003). Then, the video is rendered and returned to the user (2009 and 2011).

Figure 20B:
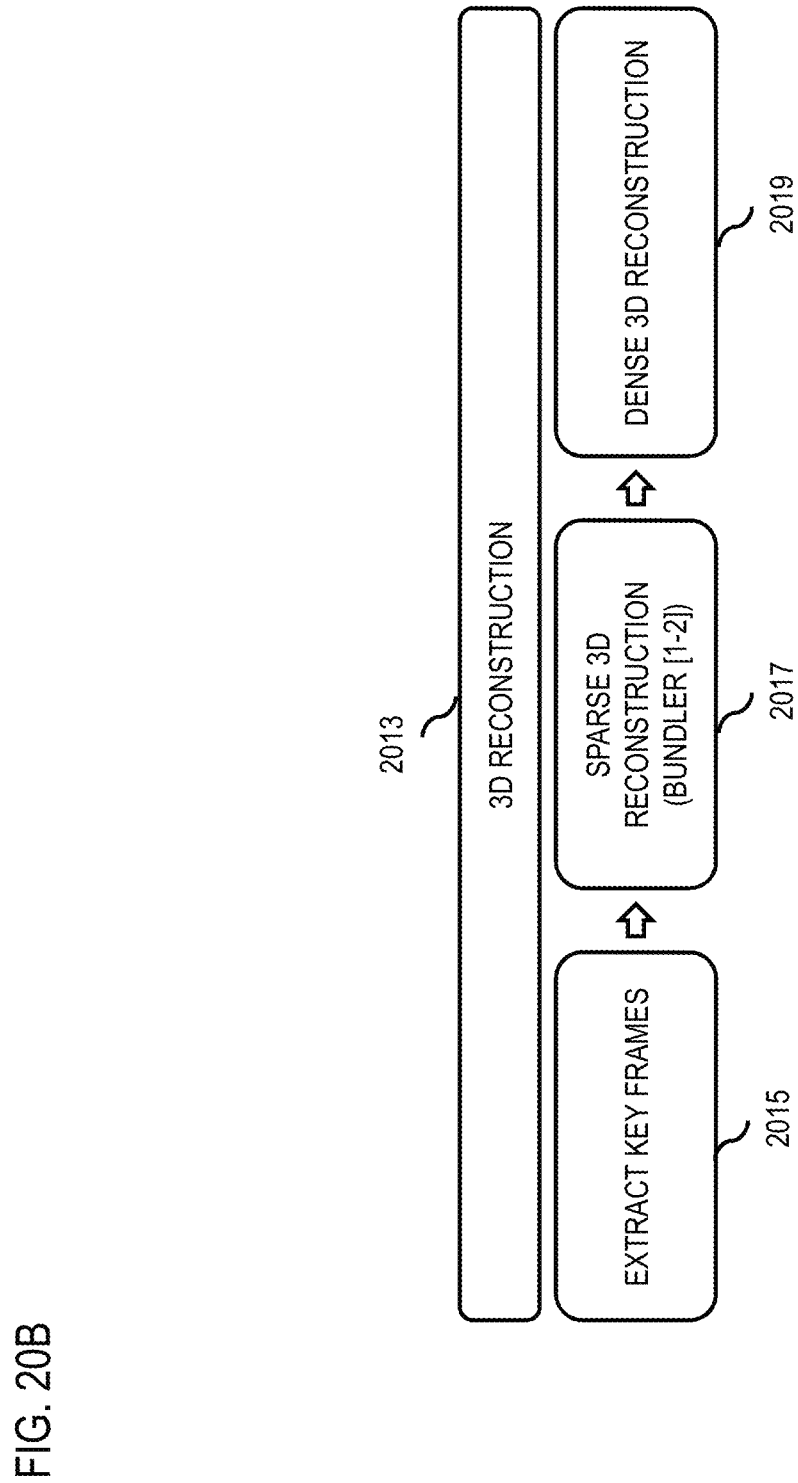

FIG. 20B is a diagram of user interface utilized in the process of FIGS. 3-8, according to various embodiments. FIG. 20B presents the three steps in the 3D reconstruction (2013). The invented ECEF coordinate tagging engine involves two important data-processing components, namely, 3D reconstruction (2005) and data alignment (2007). In one scenario, once a video clip is uploaded, ECEF coordinate tagging engine extracts the key frames (2015), reconstructs the scene as the 3D point cloud (2017) and recovers camera poses within a CCS_3D_Local system (2020).

Figure 21:

FIG. 21 is a diagram of user interface utilized in the process of FIGS. 3-8, according to one embodiment. FIGS. 21 and 21 are examples of reconstruction results, which consist of 3D point clouds for a location destination, for instance, ABC museum, and corresponding camera poses for each video frames. In one scenario, FIG. 21 presents an example of the reconstructed 3D point cloud (2101) for ABC museum and the corresponding local camera poses (2103). In one scenario, to better visualize the camera poses, camera poses of every 60 frames may be plotted.

Figure 22:
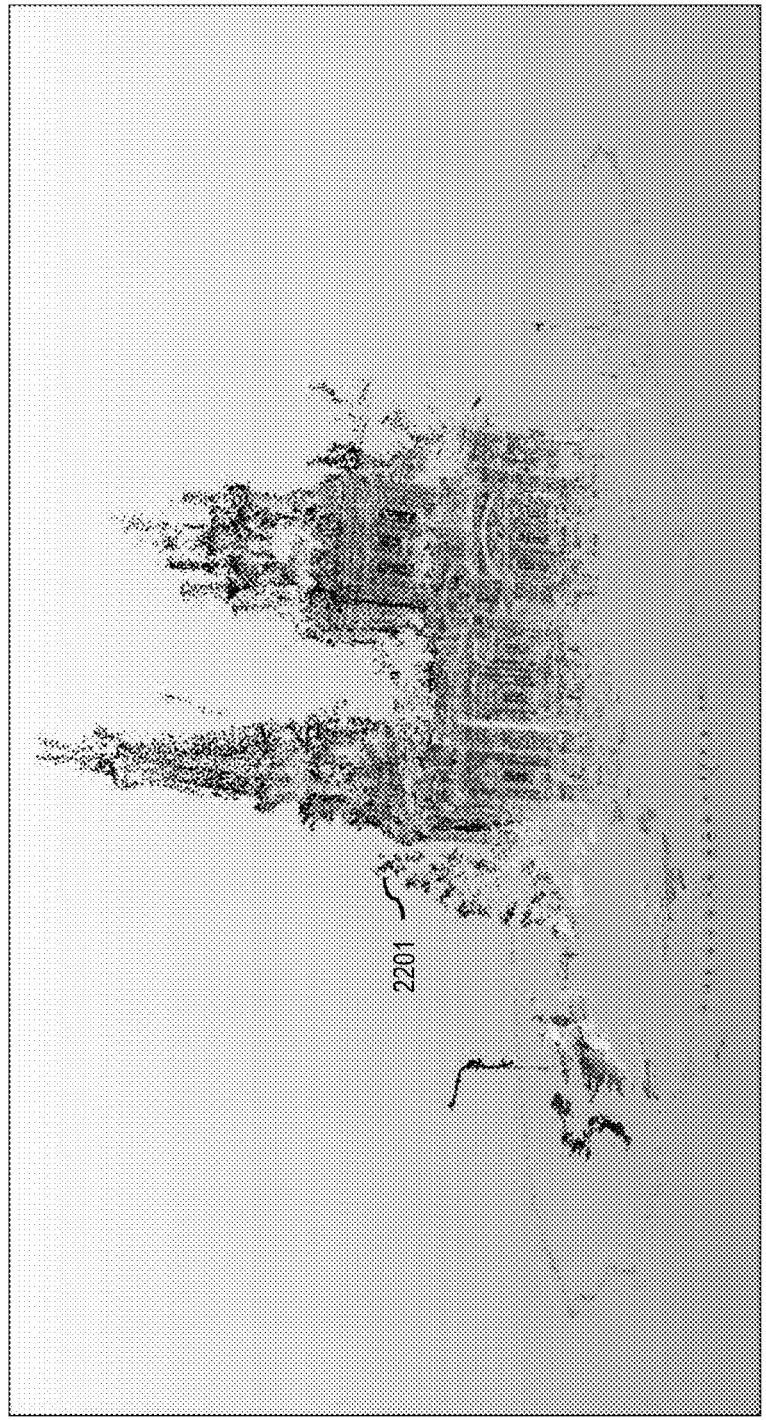

FIG. 22 is a diagram of user interface utilized in the process of FIGS. 3-8, according to one embodiment. FIG. 22 shows the same reconstructed 3D point cloud as those in FIG. 20, but the point cloud is shown with additional attributes, such as, color information whereby the centers of cameras may be denoted with colors (2201) for user convenience.

Figure 23:
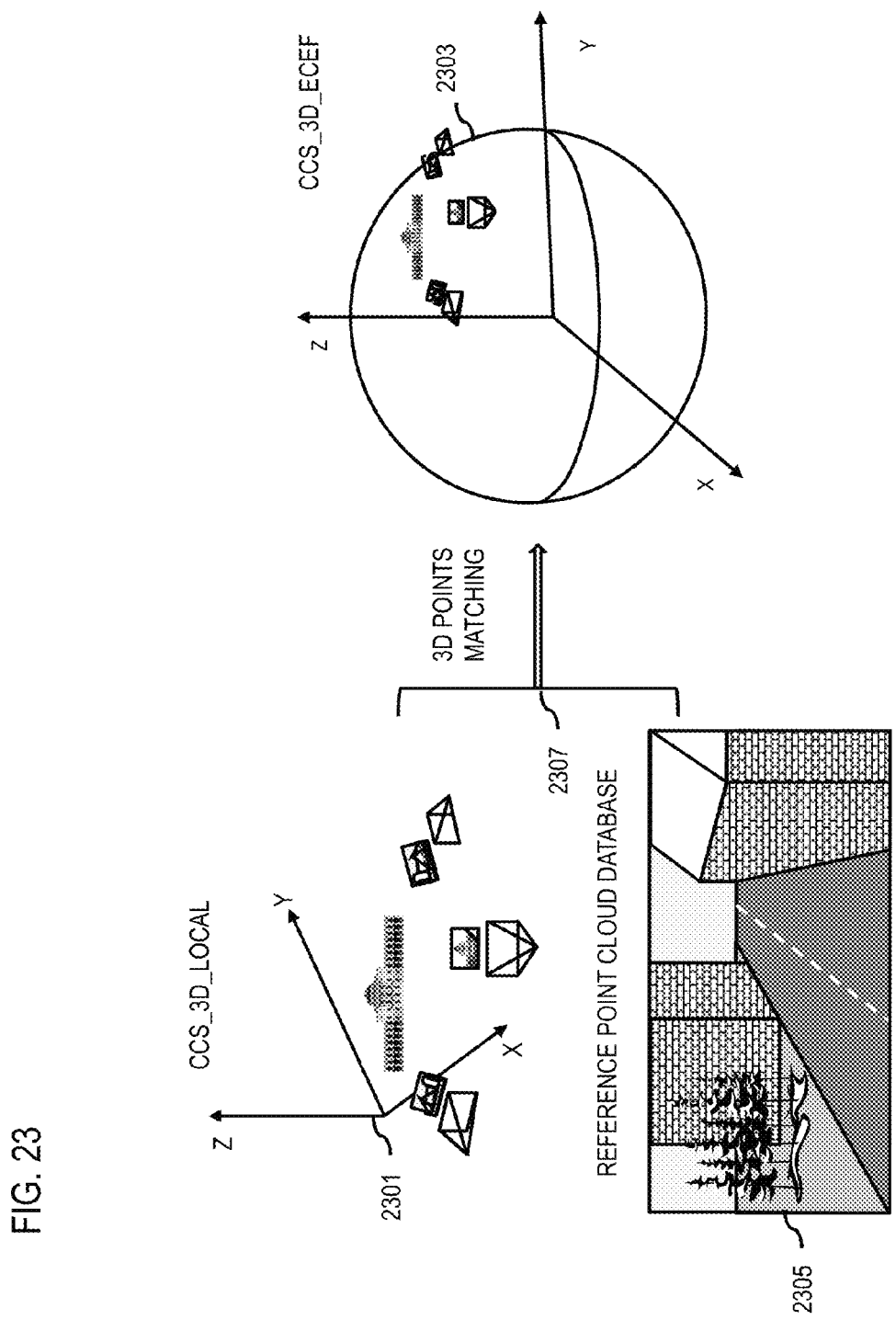

FIG. 23 is a diagram of user interface utilized in the process of FIGS. 3-8, according to various embodiments. FIG. 23 presents an example that is capable of establishing correspondence between CCS_3D_Local system (2301) and the CCS_3D_ECEF system (2303) with the help of reference point cloud data (e.g., the NAVTEQ True data) (2305) and point cloud matching technique (2307), and then represent the geocoordinate-tagged video data in CCS_3D_ECEF system. Since reconstructed point clouds from the previous step are only defined within a CCS_3D_Local system, this processing step establishes correspondences between the CCS_3D_Local system and the CCS_3D_ECEF system. In one scenario, the system can firstly use GPS data to roughly locate the area of the 3D point cloud, then take advantage of reference point cloud databases (e.g., NAVTEQ True Data) and adopt 3D point cloud matching techniques to find the exact correspondences between CCS_3D_Local system and the CCS_3D_ECEF system. By doing so, all the camera poses and 3D point cloud can be defined in CCS_3D_ECEF system. In one scenario, the identification platform 109 may mark point cloud data for augmenting the NAVTEQ database, if it cannot match the point cloud data to the NAVTEQ database.

Figure 24A:
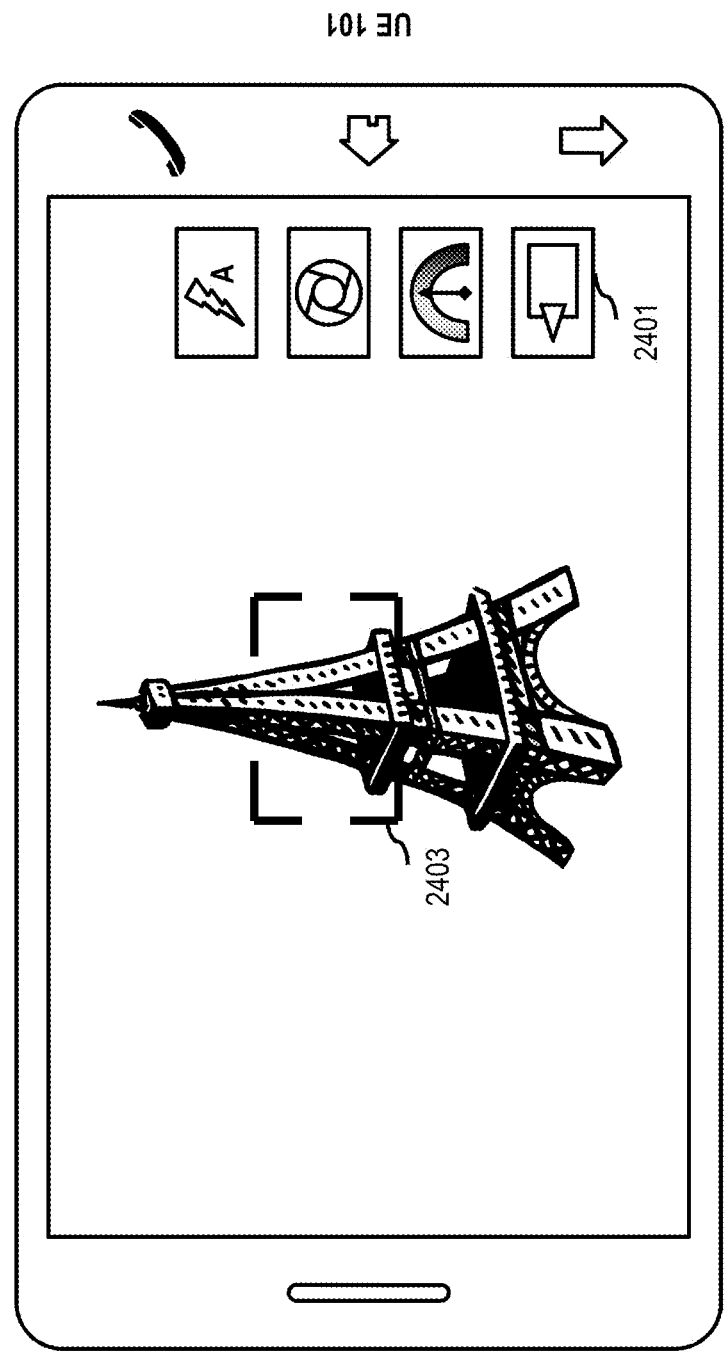
FIGS. 24A-24F are illustrations of a camera VAP meter interface superimposed on a viewfinder screen utilized in the process of FIGS. 3-8, according to various embodiments.
Figure 24B:
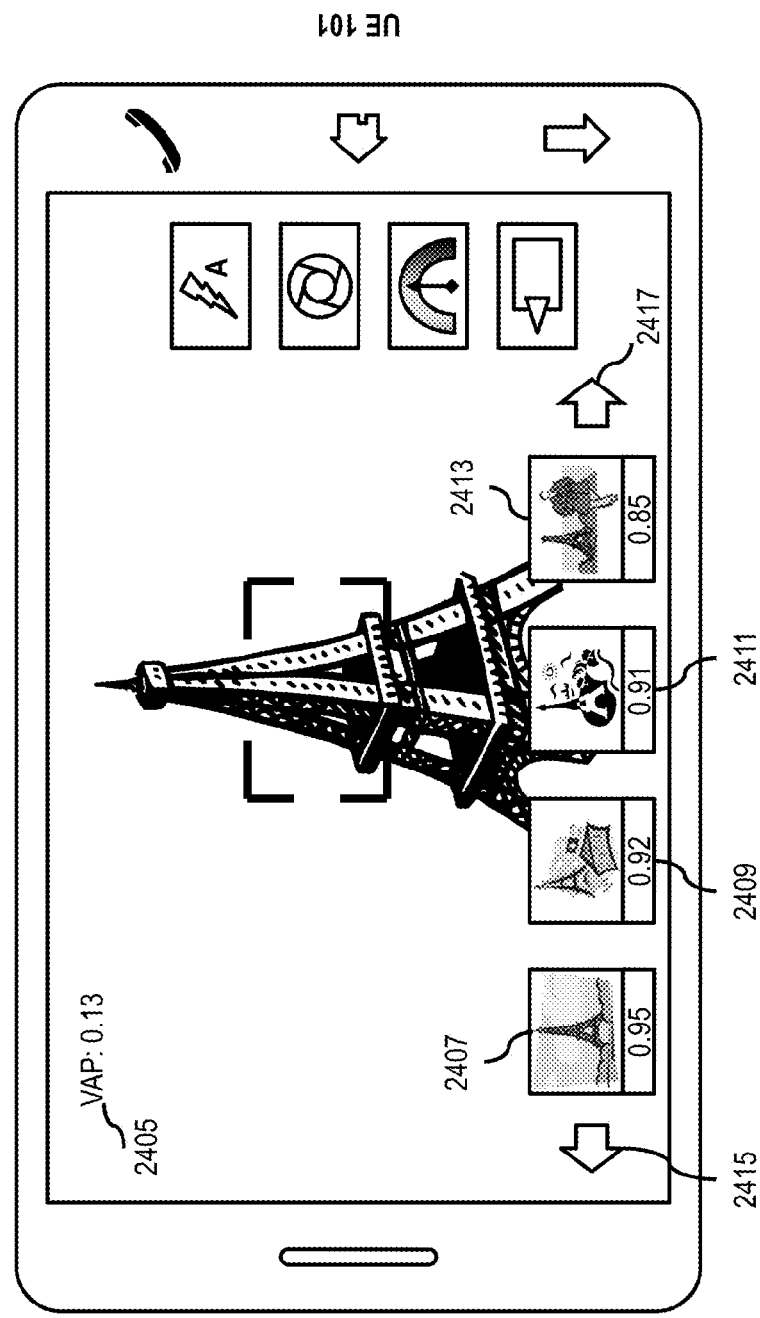
Figure 24C:
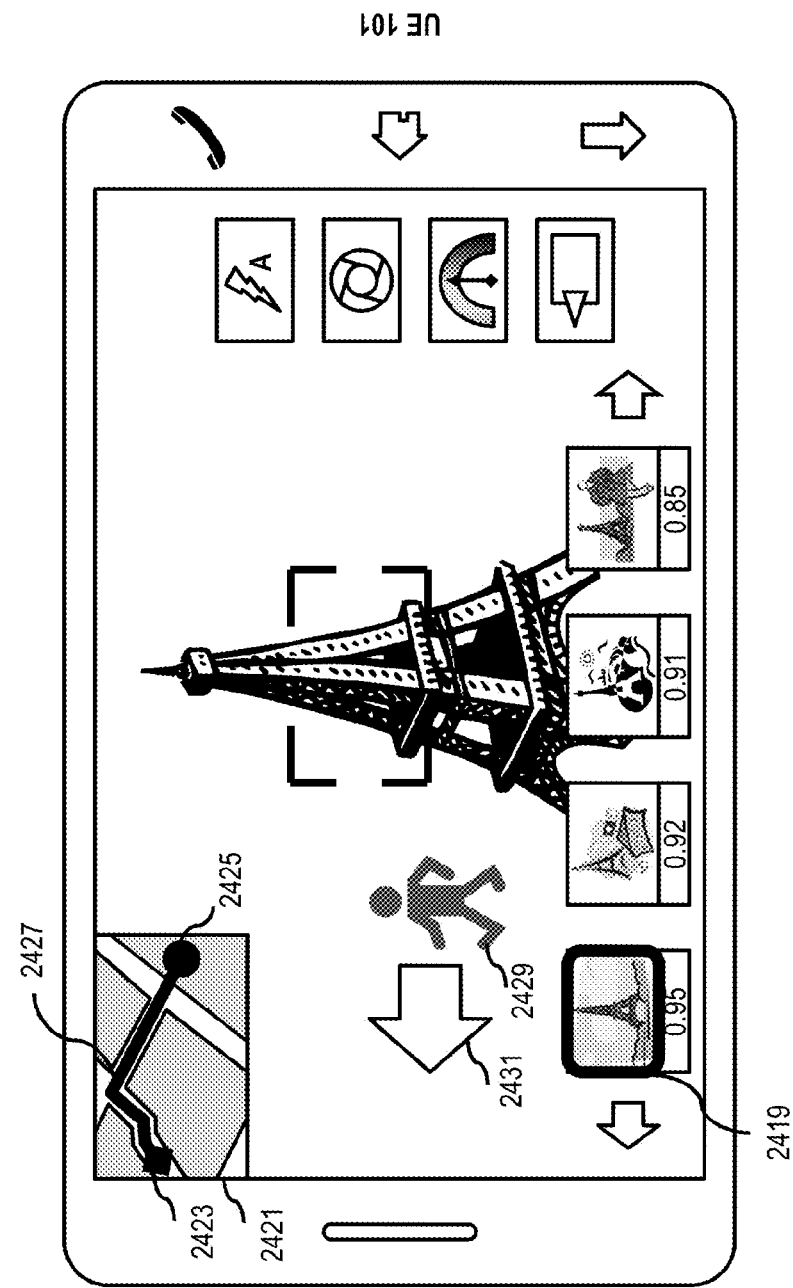
Figure 24D:
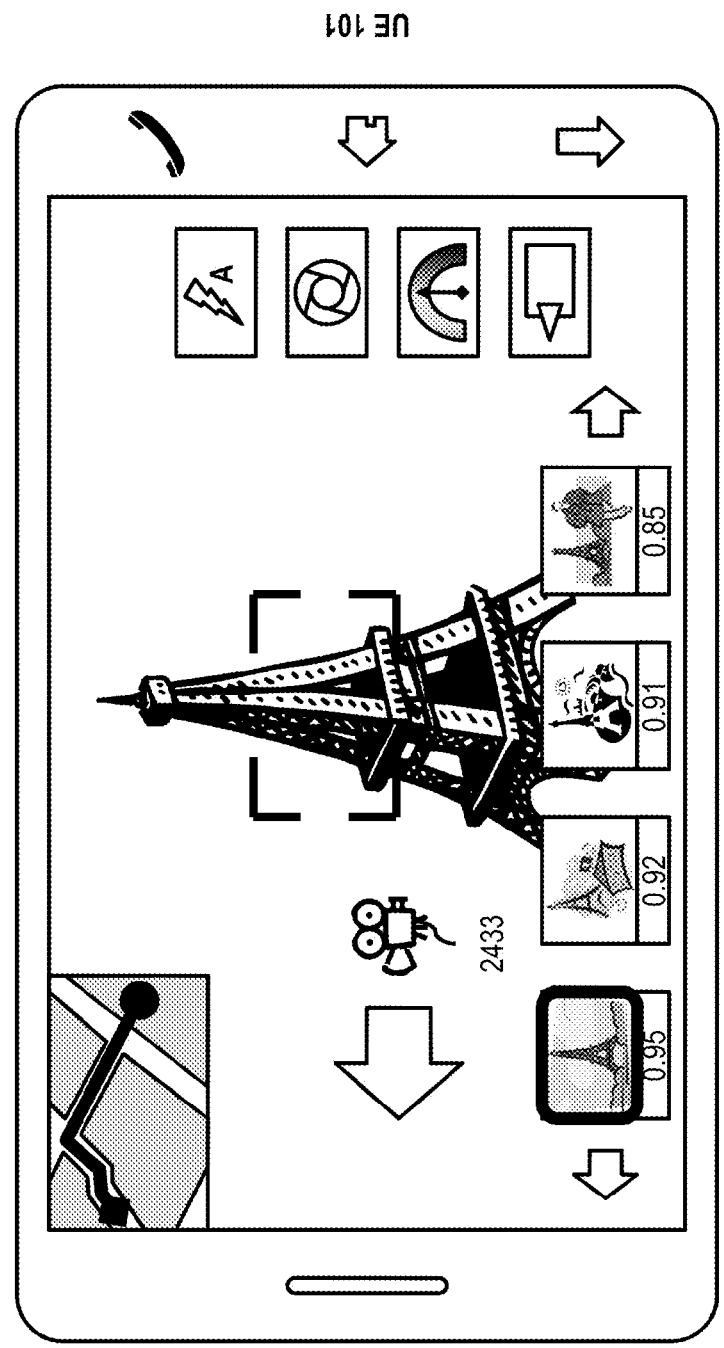

FIGS. 24A-24F are illustrations of a camera VAP meter interface superimposed on a viewfinder screen of UE 101 utilized in the process of FIGS. 3-8, according to various embodiments. While any camera viewpoints and angles within a free space might be a possible selection for users, certain poses are more favorable than others due to theirs aesthetic and/or practical values. In one scenario, an intuitive digital camera tool in UE 101, namely VAP, may provide amateur users with instant guidance to favorite photo-taking viewpoints and camera angles. This tool may be invoked as required whenever a user points the cameras to an outdoor scene. In one scenario, one or more guidance to favorite photo-taking spots may be displayed on digital camera viewfinder screens, in an augmented reality (AR) mode, thereby ensuring that users can easily focus on the composition of photos. FIG. 24A illustrates one typical design of a user interface of a camera VAP Meter, which is superimposed on the live view of digital camera viewfinder screen (i.e. the AR model). A VAP meter icon is displayed on the screen (2401), once the icon is touched by a user, the VAP meter is activated and a selection-navigation-confirmation process is invoked to guide users to a place with high camera VAP measure for capturing the image (2403). FIG. 24B is a user interface that represents a selection process whereby technology details about VAP measurement and camera pose estimation are further superimposed on the viewfinder screen. In one embodiment, VAP measure of the current camera pose is displayed on the top-left corner of the screen (2405). This VAP measure essentially quantifies the popularity of the current camera pose. In another embodiment, representative photos that are taken from nearby favorite positions are also displayed as thumbnails in bottom screen (2405, 2409, 2411, and 2413). Such thumbnails may be sorted in descending order of corresponding VAP measures. Optionally, they can be sorted according to geometric distances from the current camera position. In one scenario, if there are too many thumbnails to be displayed on the screen, left-right scrolling can be used to accommodate more photos (2415 and 2417). In one embodiment, VAP measures corresponding to representative photos are displayed respectively. FIG. 24C is a user interface that illustrates a scenario, whereby the at least one user makes a decision based on VAP information and representative photos. In one scenario, a user may decide that she/he prefers a favorite camera position to the current camera position, the user may select one favorite camera shooting spot whereby a navigation step is invoked. In one embodiment, a corresponding representative photo is highlighted for instance by a red bounding box (2419). Further, the navigation guidance to the selected camera pose is displayed in three different formats. In one scenario, the top-left screen corner shows a 2D map (2421), on which the current camera position, the selected favorite camera position and the path in between are denoted, for example, by a square dot (2424), a round dot (2425) and green line segments (2427), respectively. In one scenario, the central screen displays an image of a walking stickman (2429) and an arrow (2431) that points to the direction of the target camera viewpoint. In one scenario, the underlying camera positioning technology is not limited to sensor-based solutions, but also takes advantage of visual tracking technology and provides users with more accurate feedbacks during the course of searching target spots. FIG. 24D is a user interface whereby the central screen also shows a rotating camera (2433) to instruct users on how to rotate the camera to a preferred direction.

Figure 24E:
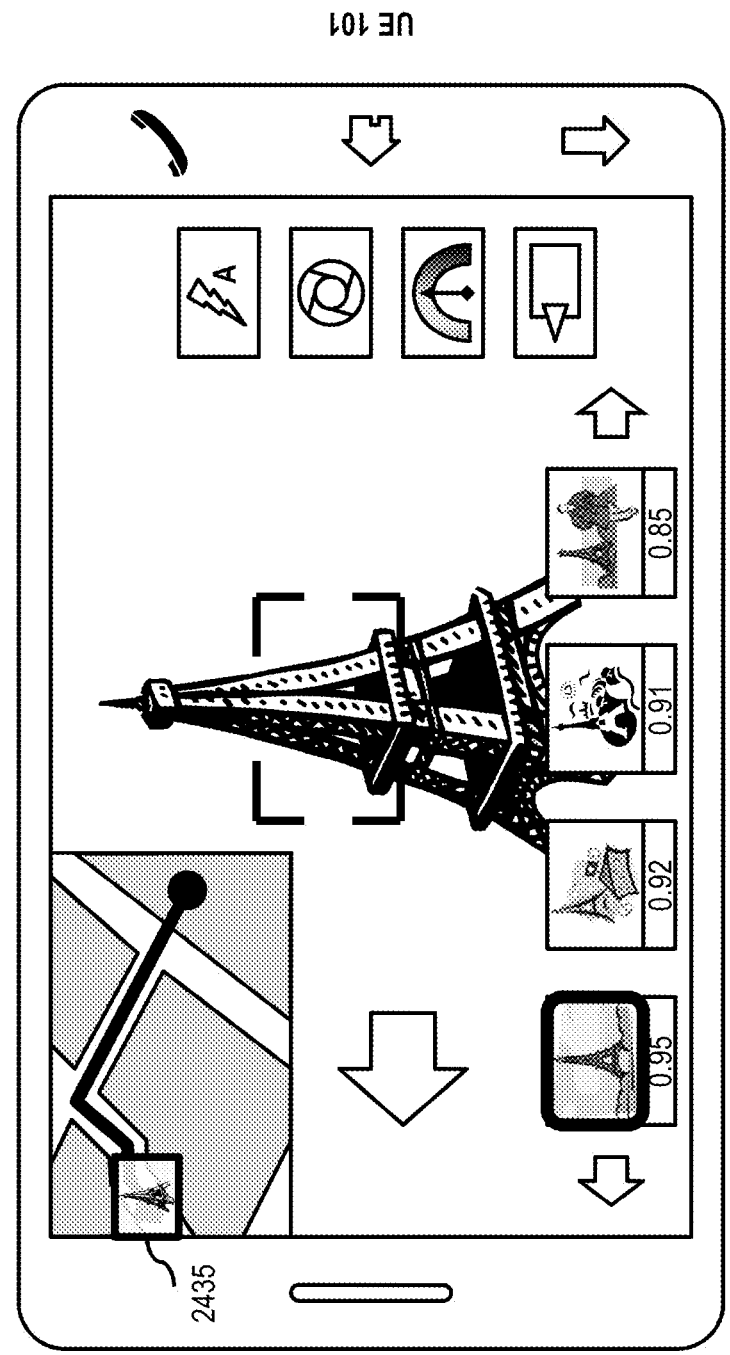
Figure 24F:
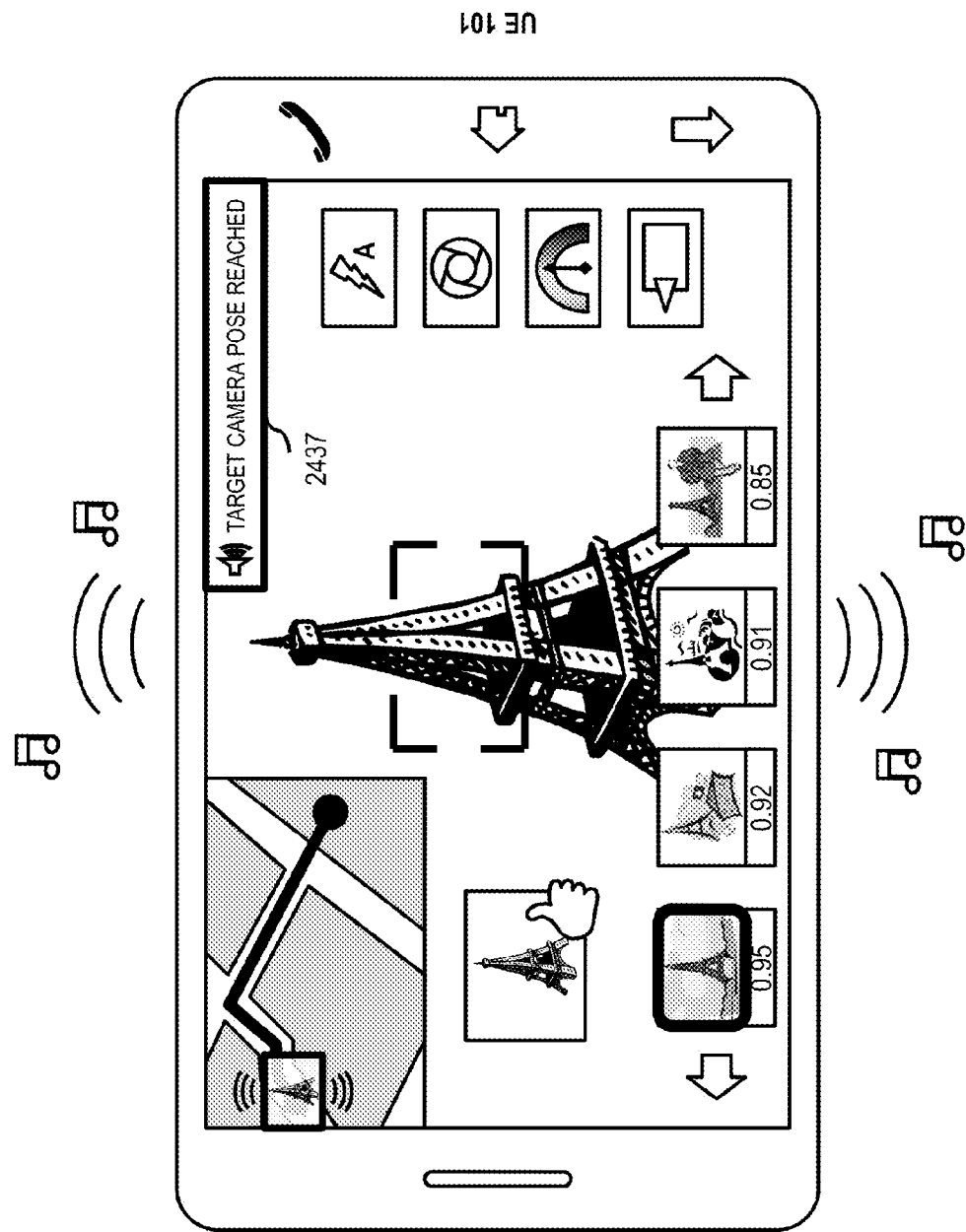

In one embodiment, when a user walks towards a favorite camera spot, the square dot (2424) and round dot (2425) converge on the map. While this visual feedback is informative, keeping tracking of two tiny dots on 2D map is often onerous and distracting for users. Therefore, two additional forms of feedback to confirm reaching the destination camera pose may be provided as illustrated in FIGS. 24E and 24F. FIG. 24E is a visual representation of the visual feedback, where one representative photo of the target camera pose is displayed as a semi-transparent image (2435) on viewfinder screen so that users may inspect differences between the representative photo and the camera viewfinder images. Since the viewfinder image is presumably the focus of the users, this feedback is noticeable and non-distracting. Optionally, the matching of the representative photo with viewfinder images can be automated by using image matching techniques. For this embodiment, when a good matching is found, for example, the target camera pose is reached, viewfinder images can be further highlighted by flashing on/off. FIG. 24F is a visual representation of audio feedback applicable to UE 101 embedded with a music player, whereby a piece of music is played when the target camera pose is reached (2437). Optionally, the loudness and pitch of the music can be modulated according to the differences between the target and current camera poses. These forms of confirmation can be used either independently or cooperatively. In one embodiment, if the user is satisfied with the selected camera pose, he/she can turn off VAP Meter by touching VAP meter icon again (2401) or simply pressing the camera shutter release button. Otherwise, the whole selection-navigation-confirmation process may repeat.

Figure 25:
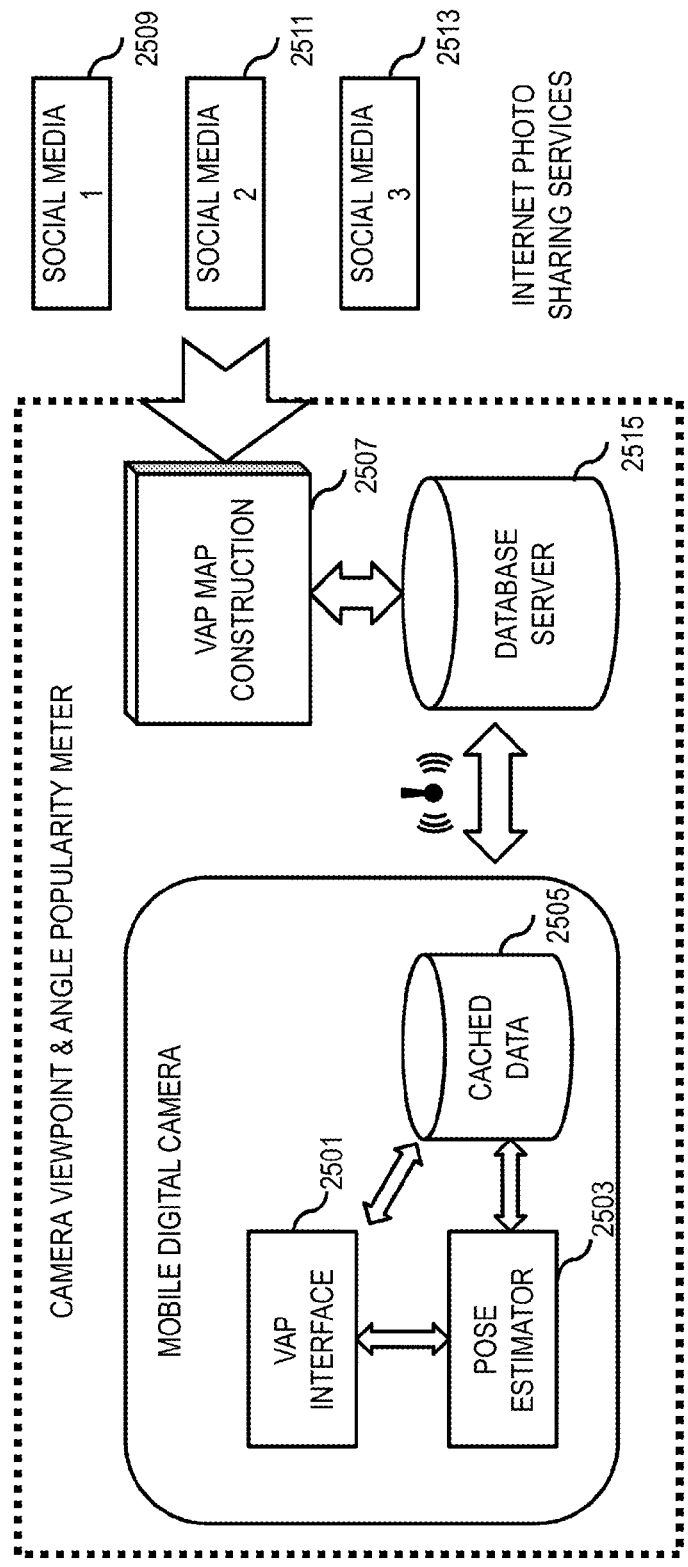
FIG. 25 illustrates the system architecture of the invented camera VAP meter, which consists of both client-side components on mobile digital cameras as well as server-side processing process and services utilized in the process of FIGS. 3-8, according to one embodiment.

FIG. 25 illustrates the system architecture of the invented camera VAP meter, which consists of both client-side components on mobile digital cameras as well as server-side processing process and services utilized in the process of FIGS. 3-8, according to one embodiment. In one embodiment, the Client-side VAP user interface (2501) is superimposed on the live view of digital camera viewfinder screen (i.e., the AR model), whereby touch screen can be used for user interaction. In one embodiment, camera pose estimator (2503) keeps track of real-time camera pose when the users adjusts the camera. Corresponding VAP measure is then retrieved from the database (2505) and shown on VAP user interfaces. Further, the VAP measure is updated instantly as the user adjusts the camera. In one embodiment, depending on the availability of UE 101's sensor hardware and mobile connections, there may be two viable options of camera pose estimating technologies namely:

In one embodiment, VAP map (2507) is used to illustrate the popularity of a specific camera pose which depends on the number of photos that have been taken with the camera pose in question. The popularity of each pose can be quantified by a real number within certain ranges (e.g. from 0.00 to 1.00), with larger numbers assigned to more popular (favorite) camera poses. In another embodiment, VAP can be measured, optionally, within different social contexts e.g. by the number of photos contributed by specific social service (2509, 2511 and 2513). Therefore, the construction of VAP map (2507) is context-dependent and often can be derived from social services (2509, 2511 and 2513) providing sharing of pictures. However, the use of these internet services can limited by any databases (2515) of outdoor scene photos. Once a VAP map has been constructed, it is either cached locally on a digital camera device or updated from a remote database server via mobile connections.

Figure 26:
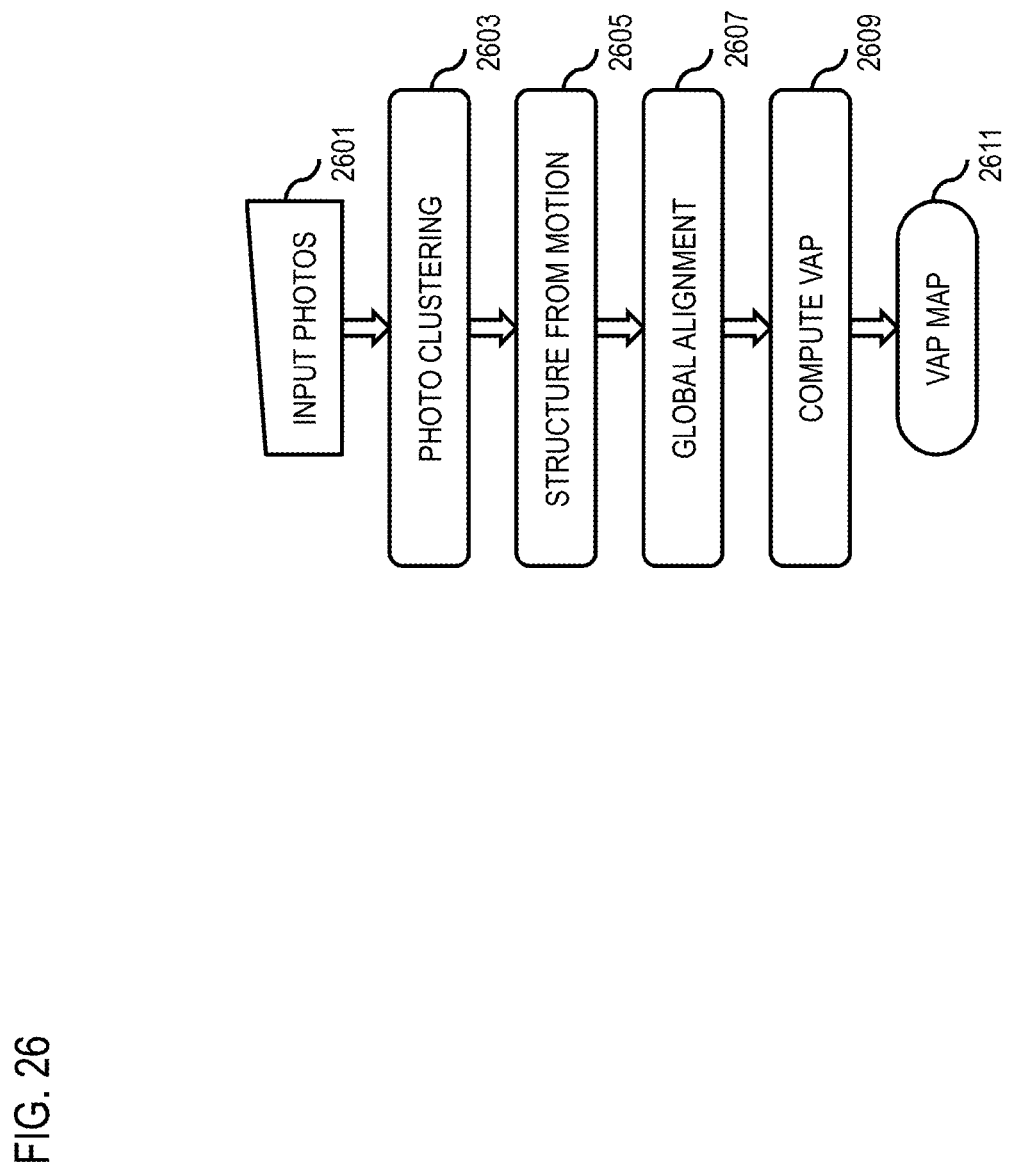
FIG. 26 is a flowchart of a VAP map construction utilized in the process of FIGS. 3-8, according to one embodiment.

FIG. 26 is a flowchart of a VAP map construction utilized in the process of FIGS. 3-8, according to one embodiment. As mentioned before, while any camera viewpoints and angles within a free space might be a possible selection for desired photo-taking, certain poses are often more favorable than others due to theirs aesthetic and/or practical values. A VAP map is a quantitative representation of the popularity of a specific camera pose (p), which depends on the number of photos that have been taken with the camera pose in question. Often the output of VAP map is mapped into a range, for example, from 0.00 to 1.00 via a real function f, with larger numbers assigned to more popular/favorite camera poses. For instance, one example VAP function is given by:

$$VAP(p)=f(\text{number\_of\_photos\_taken\_at\_}p), \qquad 1$$

where $f(x)=1-\exp(-x/a)$ and user-specified parameter $a=10$

In one embodiment, a VAP map can be measured within certain social context, for example, by the number of photos contributed by specific social networking services. Since the number of specific social group photos is relatively small, an appropriate VAP function is given by:

$$VAP(p)=f(\text{number\_of\_social\_group\_photos\_taken\_at\_}p), \qquad 2$$

where $f(x)=(x/a)$ and $a=\text{total\_number\_of\_social\_group\_photos}$.

In step 2601, identification platform 109 may input photos contributed by specific social networking services, whereby VAP maps from a large collection of given set of unstructured photos may be categorized into many subsets of photos that often correspond to a single object (step 2603). In one embodiment, the clustering process may be achieved by either using associated photo tags and/or geospatial data and/or visual word based image retrieval method. In step 2605, the VAP maps may recover 3D camera poses for each image of subset photos using standard Structure-From-Motion (SFM) techniques. While this SFM technique is popular in computer vision community, global camera poses have to be recovered by aligning input photos and reconstructed point clouds with Navteq TRUE data (step 2607). In one embodiment, for photos that are already tagged with camera poses measured by GPS and inertial sensors, the use of SFM technique is not mandatory. Nevertheless, implementation of SFM to recover camera poses of input photos significantly improves camera pose accuracies often by orders of magnitudes. In step 2609, identification platform 109 may compute VAP for each camera pose according to aforementioned equations (1) and (2), which essentially boils down to counting the number of photos that are taken at respective camera pose. In one embodiment, the identification platform 109 has to quantize camera poses into a set of discrete values (bins) and may count photos whose poses fall into respective quantization ranges. The whole set of VAP measures for all quantization ranges makes up a VAP map (step 2611).

Figure 27:
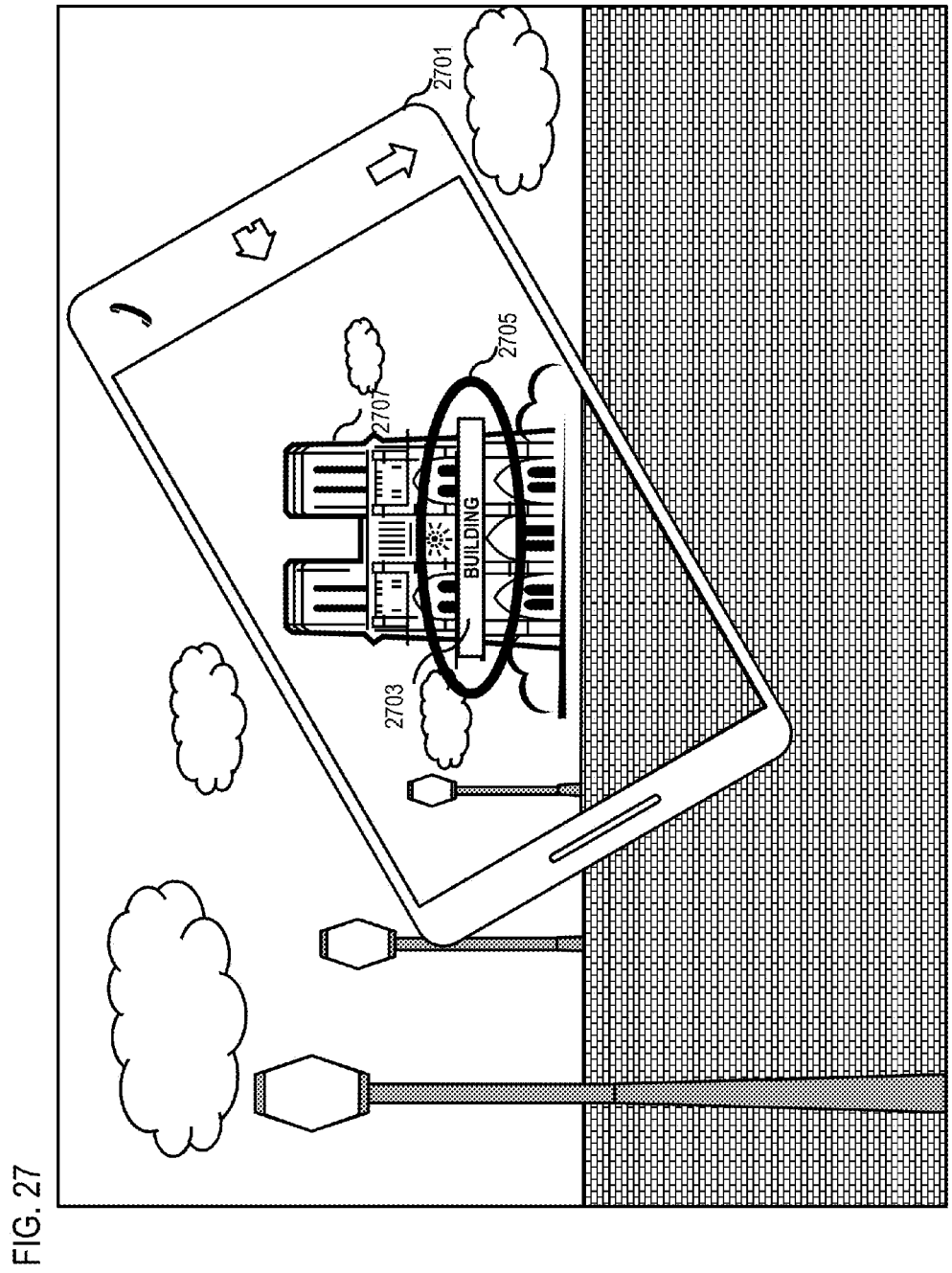
FIG. 27 is an illustration of a snapshot of the image-based pose tracking utilized in the process of FIGS. 3-8, according to one embodiment.

FIG. 27 is an illustration of a snapshot of the image-based pose tracking utilized in the process of FIGS. 3-8, according to one embodiment. In one embodiment, regardless of a variety of technological implementations, a real-time pose estimator essentially keeps track of six-degree-of-freedom (6-DoF) camera motion (2701). Depending on different UE 101s camera hardware settings, the identification platform 109 may adopts a hybrid of two optional pose estimating technologies, namely, a) GPS and inertial sensor based pose tracking; and b) image-based pose tracking Entry-level UE 101s which have limited CPU and memory capacities, adopt sensor-based estimation because of its decent responsiveness and accuracy. While more advanced smart devices may benefit from high pose accuracy provided by image-based pose estimators. In one scenario, the text (2703) highlighted in the oval (2705) is the virtual contents superimposed on viewfinder images (2707). Since feature points extracted from viewfinder images are directly matched with reference 3D points, the alignment of virtual content is more convincing than sensor-based solutions.

Figure 28:
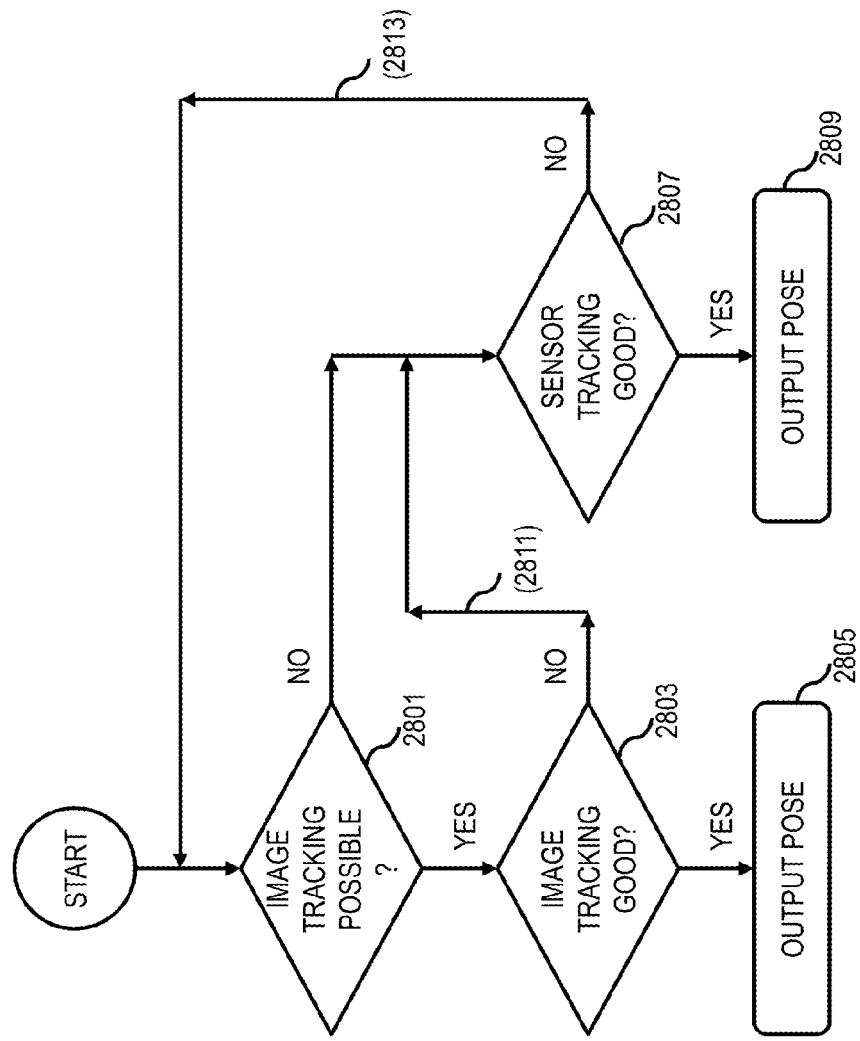
FIG. 28 is a flowchart of a hybrid camera pose estimation utilized in the process of FIGS. 3-8, according to one embodiment.

FIG. 28 is a flowchart of a hybrid camera pose estimation utilized in the process of FIGS. 3-8, according to one embodiment. In one embodiment, the image based pose tracking is invoked as much as possible, while sensor based tracking is used only if the image based tracking is unavailable or unreliable. In step 2801, the identification platform 109 may determine the possibility of image based pose tracking in the at least one UE 101. In one scenario, upon determining image tracking is possible, the identification platform 109 may further determine the accuracy provided by image-based pose estimators (step 2803) and may provide the image tracking as an output pose based, at least in part, on a determination that the image tracking is accurate (step 2805). On the other hand, if the identification platform 109 is of determination that the image based pose estimator is inaccurate or unreliable then the identification platform 109 may opt for sensor based tracking (step 2811). In one scenario, the identification platform 109 may be of determination that image based tracking is unavailable for the one or more UE 101, whereby the identification platform 109 may invoke sensor based pose tracking (step 2807) and may provide the sensor based pose tracking as an output pose based, at least in part, on a determination that the sensor tracking is accurate (step 2809). On the other hand, if the identification platform 109 is of determination that the sensor based pose tracking is erroneous or imprecise, the identification platform 109 may select image based tracking for generating the output pose (step 2813).

The processes described herein for processing one or more images to determine camera location information and/or camera pose information, wherein these information are represented according to a global coordinate system, thereby causing, at least in part, an association of these information with the one or more images as meta-data information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 29:
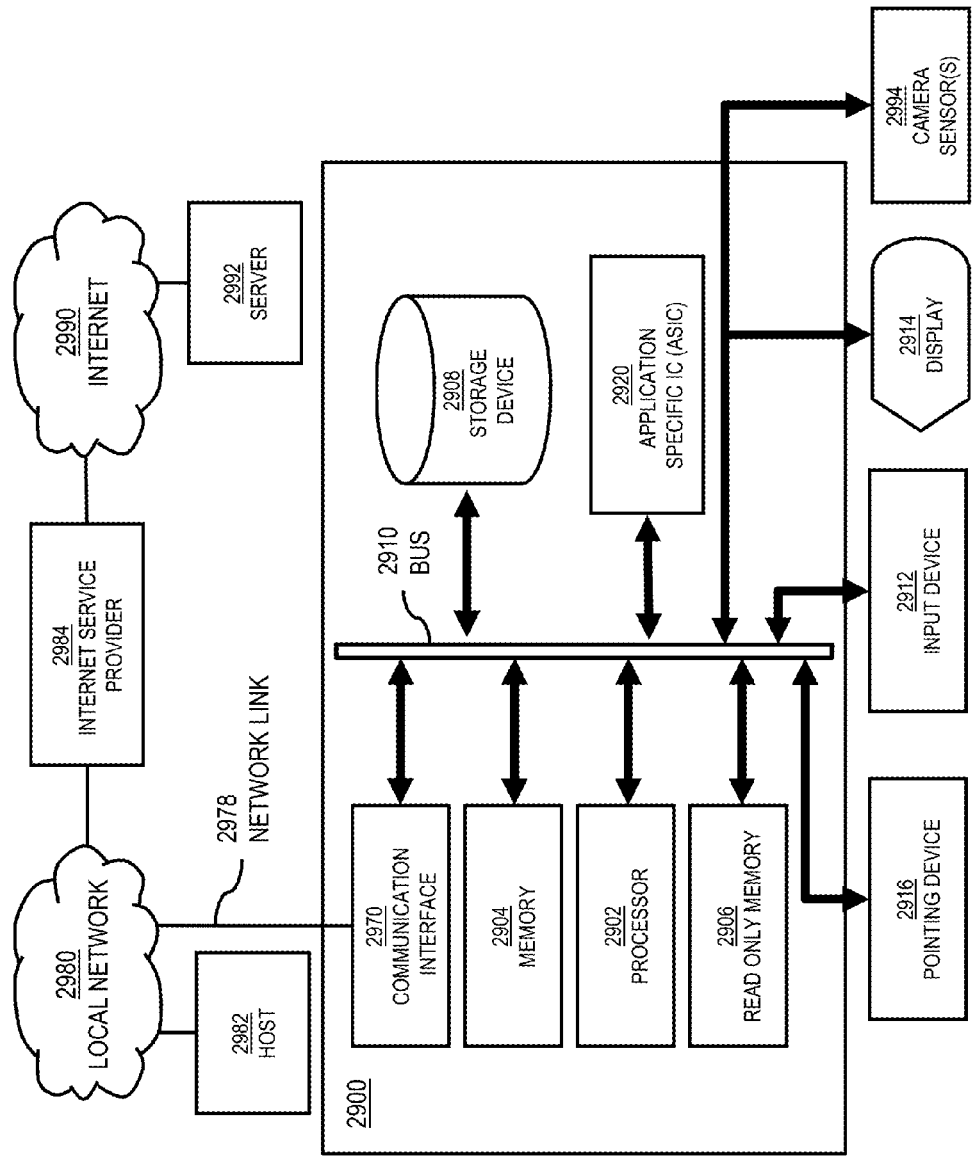
FIG. 29 is a diagram of hardware that can be used to implement an embodiment of the invention.

FIG. 29 illustrates a computer system 2900 upon which an embodiment of the invention may be implemented. Although computer system 2900 is depicted with respect to a particular device or equipment, it is contemplated that other devices or equipment (e.g., network elements, servers, etc.) within FIG. 29 can deploy the illustrated hardware and components of system 2900. Computer system 2900 is programmed (e.g., via computer program code or instructions) to process one or more images to determine camera location information and/or camera pose information, wherein the information are represented according to a global coordinate system, thereby causing, at least in part, an association of these information with the one or more images as meta-data information as described herein and includes a communication mechanism such as a bus 2910 for passing information between other internal and external components of the computer system 2900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2900, or a portion thereof, constitutes a means for performing one or more steps of processing one or more images to determine camera location information and/or camera pose information, wherein the information are represented according to a global coordinate system, thereby causing, at least in part, an association of the information with the one or more images as meta-data information.

A bus 2910 includes one or more parallel conductors of information so that information is transferred quickly among devices coupled to the bus 2910. One or more processors 2902 for processing information are coupled with the bus 2910.

A processor (or multiple processors) 2902 performs a set of operations on information as specified by computer program code related to process one or more images to determine camera location information and/or camera pose information, wherein the information are represented according to a global coordinate system, thereby causing, at least in part, an association of the information with the one or more images as meta-data information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 2910 and placing information on the bus 2910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 2902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 2900 also includes a memory 2904 coupled to bus 2910. The memory 2904, such as a random access memory (RAM) or any other dynamic storage device, stores information including processor instructions for processing one or more images to determine camera location information and/or camera pose information, wherein the information are represented according to a global coordinate system, thereby causing, at least in part, an association of the information with the one or more images as meta-data information. Dynamic memory allows information stored therein to be changed by the computer system 2900. RAM allows a unit of information stored at a location called a memory address to be stored and retrieved independently of information at neighboring addresses. The memory 2904 is also used by the processor 2902 to store temporary values during execution of processor instructions. The computer system 2900 also includes a read only memory (ROM) 2906 or any other static storage device coupled to the bus 2910 for storing static information, including instructions, that is not changed by the computer system 2900. Some memory is composed of volatile storage that loses the information stored thereon when power is lost. Also coupled to bus 2910 is a non-volatile (persistent) storage device 2908, such as a magnetic disk, optical disk or flash card, for storing information, including instructions, that persists even when the computer system 2900 is turned off or otherwise loses power.

Information, including instructions for processing one or more images to determine camera location information and/or camera pose information, wherein the information are represented according to a global coordinate system, thereby causing, at least in part, an association of the information with the one or more images as meta-data information, is provided to the bus 2910 for use by the processor from an external input device 2912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 2900. Other external devices coupled to bus 2910, used primarily for interacting with humans, include a display device 2914, such as a cathode ray tube (CRT), a liquid crystal display (LCD), a light emitting diode (LED) display, an organic LED (OLED) display, a plasma screen, or a printer for presenting text or images, and a pointing device 2916, such as a mouse, a trackball, cursor direction keys, or a motion sensor, for controlling a position of a small cursor image presented on the display 2914 and issuing commands associated with graphical elements presented on the display 2914, and one or more camera sensors 2994 for capturing, recording and causing to store one or more still and/or moving images (e.g., videos, movies, etc.) which also may comprise audio recordings. In some embodiments, for example, in embodiments in which the computer system 2900 performs all functions automatically without human input, one or more of external input device 2912, display device 2914 and pointing device 2916 may be omitted.

In the illustrated embodiment, special purpose hardware, such as an application specific integrated circuit (ASIC) 2920, is coupled to bus 2910. The special purpose hardware is configured to perform operations not performed by processor 2902 quickly enough for special purposes. Examples of ASICs include graphics accelerator cards for generating images for display 2914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 2900 also includes one or more instances of a communications interface 2970 coupled to bus 2910. Communication interface 2970 provides a one-way or two-way communication coupling to a variety of external devices that operate with their own processors, such as printers, scanners and external disks. In general the coupling is with a network link 2978 that is connected to a local network 2980 to which a variety of external devices with their own processors are connected. For example, communication interface 2970 may be a parallel port or a serial port or a universal serial bus (USB) port on a personal computer. In some embodiments, communications interface 2970 is an integrated services digital network (ISDN) card or a digital subscriber line (DSL) card or a telephone modem that provides an information communication connection to a corresponding type of telephone line. In some embodiments, a communication interface 2970 is a cable modem that converts signals on bus 2910 into signals for a communication connection over a coaxial cable or into optical signals for a communication connection over a fiber optic cable. As another example, communications interface 2970 may be a local area network (LAN) card to provide a data communication connection to a compatible LAN, such as Ethernet. Wireless links may also be implemented. For wireless links, the communications interface 2970 sends or receives or both sends and receives electrical, acoustic or electromagnetic signals, including infrared and optical signals, that carry information streams, such as digital data. For example, in wireless handheld devices, such as mobile telephones like cell phones, the communications interface 2970 includes a radio band electromagnetic transmitter and receiver called a radio transceiver. In certain embodiments, the communications interface 2970 enables connection to the communication network 105 for processing one or more images to determine camera location information and/or camera pose information, wherein the information are represented according to a global coordinate system, thereby causing, at least in part, an association of the information with the one or more images as meta-data information to the UE 101.

The term "computer-readable medium" as used herein refers to any medium that participates in providing information to processor 2902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 2908. Volatile media include, for example, dynamic memory 2904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 2920.

Network link 2978 typically provides information communication using transmission media through one or more networks to other devices that use or process the information. For example, network link 2978 may provide a connection through local network 2980 to a host computer 2982 or to equipment 2984 operated by an Internet Service Provider (ISP). ISP equipment 2984 in turn provides data communication services through the public, world-wide packet-switching communication network of networks now commonly referred to as the Internet 2990.

A computer called a server host 2992 connected to the Internet hosts a process that provides a service in response to information received over the Internet. For example, server host 2992 hosts a process that provides information representing video data for presentation at display 2914. It is contemplated that the components of system 2900 can be deployed in various configurations within other computer systems, e.g., host 2982 and server 2992.

At least some embodiments of the invention are related to the use of computer system 2900 for implementing some or all of the techniques described herein. According to one embodiment of the invention, those techniques are performed by computer system 2900 in response to processor 2902 executing one or more sequences of one or more processor instructions contained in memory 2904. Such instructions, also called computer instructions, software and program code, may be read into memory 2904 from another computer-readable medium such as storage device 2908 or network link 2978. Execution of the sequences of instructions contained in memory 2904 causes processor 2902 to perform one or more of the method steps described herein. In alternative embodiments, hardware, such as ASIC 2920, may be used in place of or in combination with software to implement the invention. Thus, embodiments of the invention are not limited to any specific combination of hardware and software, unless otherwise explicitly stated herein.

The signals transmitted over network link 2978 and other networks through communications interface 2970, carry information to and from computer system 2900. Computer system 2900 can send and receive information, including program code, through the networks 2980, 2990 among others, through network link 2978 and communications interface 2970. In an example using the Internet 2990, a server host 2992 transmits program code for a particular application, requested by a message sent from computer 2900, through Internet 2990, ISP equipment 2984, local network 2980 and communications interface 2970. The received code may be executed by processor 2902 as it is received, or may be stored in memory 2904 or in storage device 2908 or any other non-volatile storage for later execution, or both. In this manner, computer system 2900 may obtain application program code in the form of signals on a carrier wave.

Various forms of computer readable media may be involved in carrying one or more sequence of instructions or data or both to processor 2902 for execution. For example, instructions and data may initially be carried on a magnetic disk of a remote computer such as host 2982. The remote computer loads the instructions and data into its dynamic memory and sends the instructions and data over a telephone line using a modem. A modem local to the computer system 2900 receives the instructions and data on a telephone line and uses an infra-red transmitter to convert the instructions and data to a signal on an infra-red carrier wave serving as the network link 2978. An infrared detector serving as communications interface 2970 receives the instructions and data carried in the infrared signal and places information representing the instructions and data onto bus 2910. Bus 2910 carries the information to memory 2904 from which processor 2902 retrieves and executes the instructions using some of the data sent with the instructions. The instructions and data received in memory 2904 may optionally be stored on storage device 2908, either before or after execution by the processor 2902.

FIG. 30 illustrates a chip set or chip 3000 upon which an embodiment of the invention may be implemented. Chip set 3000 is programmed to process one or more images to determine camera location information and/or camera pose information, wherein the information are represented according to a global coordinate system, thereby causing, at least in part, an association of the information with the one or more images as meta-data information as described herein and includes, for instance, the processor and memory components described with respect to FIG. 29 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 3000 can be implemented in a single chip. It is further contemplated that in certain embodiments the chip set or chip 3000 can be implemented as a single "system on a chip." It is further contemplated that in certain embodiments a separate ASIC would not be used, for example, and that all relevant functions as disclosed herein would be performed by a processor or processors. Chip set or chip 3000, or a portion thereof, constitutes a means for performing one or more steps of providing user interface navigation information associated with the availability of functions. Chip set or chip 3000, or a portion thereof, constitutes a means for performing one or more steps of processing one or more images to determine camera location information and/or camera pose information, wherein the information are represented according to a global coordinate system, thereby causing, at least in part, an association of the information with the one or more images as meta-data information.

In one embodiment, the chip set or chip 3000 includes a communication mechanism such as a bus 3001 for passing information among the components of the chip set 3000. A processor 3003 has connectivity to the bus 3001 to execute instructions and process information stored in, for example, a memory 3005. The processor 3003 may include one or more processing cores with each core configured to perform independently. A multi-core processor enables multiprocessing within a single physical package. Examples of a multi-core processor include two, four, eight, or greater numbers of processing cores. Alternatively or in addition, the processor 3003 may include one or more microprocessors configured in tandem via the bus 3001 to enable independent execution of instructions, pipelining, and multithreading. The processor 3003 may also be accompanied with one or more specialized components to perform certain processing functions and tasks such as one or more digital signal processors (DSP) 3007, or one or more application-specific integrated circuits (ASIC) 3009. A DSP 3007 typically is configured to process real-world signals (e.g., sound) in real time independently of the processor 3003. Similarly, an ASIC 3009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 3000 includes merely one or more processors and some software and/or firmware supporting and/or relating to and/or for the one or more processors.

The processor 3003 and accompanying components have connectivity to the memory 3005 via the bus 3001. The memory 3005 includes both dynamic memory (e.g., RAM, magnetic disk, writable optical disk, etc.) and static memory (e.g., ROM, CD-ROM, etc.) for storing executable instructions that when executed perform the inventive steps described herein to process one or more images to determine camera location information and/or camera pose information, wherein the information are represented according to a global coordinate system, thereby causing, at least in part, an association of the information with the one or more images as meta-data information. The memory 3005 also stores the data associated with or generated by the execution of the inventive steps.

Figure 31:
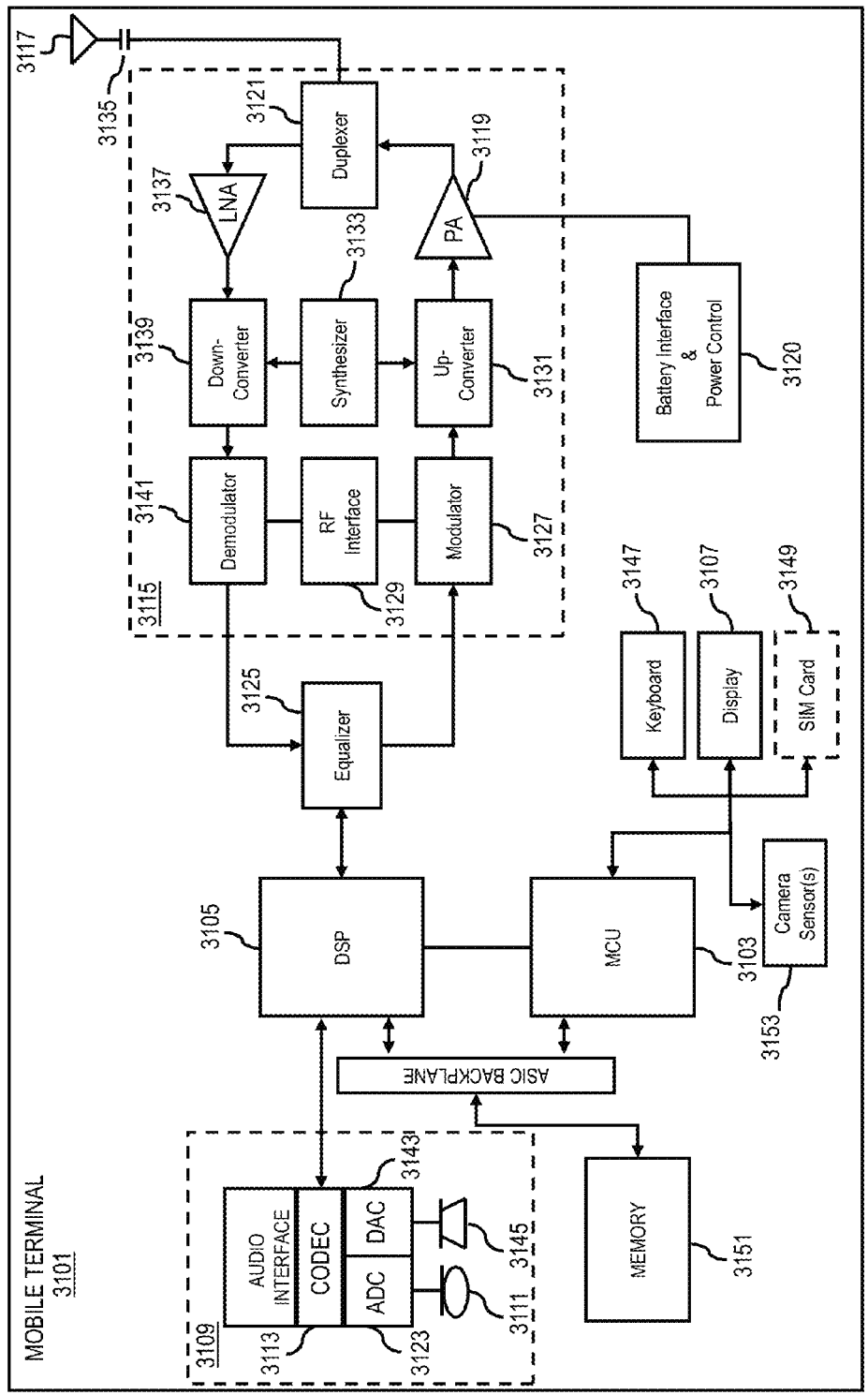
FIG. 31 is a diagram of a mobile terminal (e.g., handset) that can be used to implement an embodiment of the invention.

FIG. 31 is a diagram of exemplary components of a mobile terminal (e.g., handset) for communications, which is capable of operating in the system of FIG. 1, according to one embodiment. In some embodiments, mobile terminal 3101, or a portion thereof, constitutes a means for performing one or more steps of processing one or more images to determine camera location information and/or camera pose information, wherein the information are represented according to a global coordinate system, thereby causing, at least in part, an association of the information with the one or more images as meta-data information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 3103, a Digital Signal Processor (DSP) 3105, and a receiver/transmitter unit including a microphone gain control unit and a speaker gain control unit. A main display unit 3107 provides a display to the user in support of various applications and mobile terminal functions that perform or support the steps of processing one or more images to determine camera location information and/or camera pose information, wherein the information are represented according to a global coordinate system, thereby causing, at least in part, an association of the information with the one or more images as meta-data information. The display 3107 includes display circuitry configured to display at least a portion of a user interface of the mobile terminal (e.g., mobile telephone). Additionally, the display 3107 and display circuitry are configured to facilitate user control of at least some functions of the mobile terminal. An audio function circuitry 3109 includes a microphone 3111 and microphone amplifier that amplifies the speech signal output from the microphone 3111. The amplified speech signal output from the microphone 3111 is fed to a coder/decoder (CODEC) 3113.

A radio section 3115 amplifies power and converts frequency in order to communicate with a base station, which is included in a mobile communication system, via antenna 3117. The power amplifier (PA) 3119 and the transmitter/modulation circuitry are operationally responsive to the MCU 3103, with an output from the PA 3119 coupled to the duplexer 3121 or circulator or antenna switch, as known in the art. The PA 3119 also couples to a battery interface and power control unit 3120.

In use, a user of mobile terminal 3101 speaks into the microphone 3111 and his or her voice along with any detected background noise is converted into an analog voltage. The analog voltage is then converted into a digital signal through the Analog to Digital Converter (ADC) 3123. The control unit 3103 routes the digital signal into the DSP 3105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 3125 for compensation of any frequency-dependent impairments that occur during transmission though the air such as phase and amplitude distortion. After equalizing the bit stream, the modulator 3127 combines the signal with a RF signal generated in the RF interface 3129. The modulator 3127 generates a sine wave by way of frequency or phase modulation. In order to prepare the signal for transmission, an up-converter 3131 combines the sine wave output from the modulator 3127 with another sine wave generated by a synthesizer 3133 to achieve the desired frequency of transmission. The signal is then sent through a PA 3119 to increase the signal to an appropriate power level. In practical systems, the PA 3119 acts as a variable gain amplifier whose gain is controlled by the DSP 3105 from information received from a network base station. The signal is then filtered within the duplexer 3121 and optionally sent to an antenna coupler 3135 to match impedances to provide maximum power transfer. Finally, the signal is transmitted via antenna 3117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 3101 are received via antenna 3117 and immediately amplified by a low noise amplifier (LNA) 3137. A down-converter 3139 lowers the carrier frequency while the demodulator 3141 strips away the RF leaving only a digital bit stream. The signal then goes through the equalizer 3125 and is processed by the DSP 3105. A Digital to Analog Converter (DAC) 3143 converts the signal and the resulting output is transmitted to the user through the speaker 3145, all under control of a Main Control Unit (MCU) 3103 which can be implemented as a Central Processing Unit (CPU).

The MCU 3103 receives various signals including input signals from the keyboard 3147. The keyboard 3147 and/or the MCU 3103 in combination with other user input components (e.g., the microphone 3111) comprise a user interface circuitry for managing user input. The MCU 3103 runs a user interface software to facilitate user control of at least some functions of the mobile terminal 3101 to process one or more images to determine camera location information and/or camera pose information, wherein the information are represented according to a global coordinate system, thereby causing, at least in part, an association of the information with the one or more images as meta-data information. The MCU 3103 also delivers a display command and a switch command to the display 3107 and to the speech output switching controller, respectively. Further, the MCU 3103 exchanges information with the DSP 3105 and can access an optionally incorporated SIM card 3149 and a memory 3151. In addition, the MCU 3103 executes various control functions required of the terminal. The DSP 3105 may, depending upon the implementation, perform any of a variety of conventional digital processing functions on the voice signals. Additionally, DSP 3105 determines the background noise level of the local environment from the signals detected by microphone 3111 and sets the gain of microphone 3111 to a level selected to compensate for the natural tendency of the user of the mobile terminal 3101.

The CODEC 3113 includes the ADC 3123 and DAC 3143. The memory 3151 stores various data including call incoming tone data and is capable of storing other data including music data received via, e.g., the global Internet. The software module could reside in RAM memory, flash memory, registers, or any other form of writable storage medium known in the art. The memory device 3151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 3149 carries, for instance, important information, such as the cellular phone number, the carrier supplying service, subscription details, and security information. The SIM card 3149 serves primarily to identify the mobile terminal 3101 on a radio network. The card 3149 also contains a memory for storing a personal telephone number registry, text messages, and user specific mobile terminal settings.

Further, one or more camera sensors 3153 may be incorporated onto the mobile station 3101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of, or processing, (1) data, (2) information, or (3) at least one signal, the (1) data, (2) information, (3) at least one signal based, at least in part, on the following:

a selection of one or more images from among one or more frames of at least one video sequence, wherein the one or more images represent, at least in part, a subset of the one or more frames;

a processing of the one or more images to determine camera location information, camera pose information, or a combination thereof associated with at least one camera capturing the one or more images, wherein the camera location information, the camera pose information, or a combination thereof is represented according to a local three-dimensional (3D) Cartesian coordinate system;

a processing of the one or more images to determine a local point cloud of one or more objects depicted in the one or more images, wherein the local point cloud is represented according to the local 3D Cartesian coordinate system;

at least one determination of one or more reference point clouds represented according to an Earth Centered, Earth Fixed (ECEF) 3D Cartesian coordinate system based, at least in part, on the camera location information, location sensor data, or a combination thereof associated with the at least one camera;

a processing of at least one of the one or more reference point clouds represented according to the ECEF 3D Cartesian coordinate system to determine a correspondence of the local point cloud represented in the local 3D Cartesian coordinate system, wherein the correspondence maps the camera location information and the camera pose information from the local 3D Cartesian coordinate system to the ECEF 3D Cartesian coordinate system;

an association of the camera location information or the camera pose information represented according to the ECEF 3D Cartesian coordinate system with the one or more images as metadata information; and post-processing of the at least one video sequence to extract 3D geo-augmented metadata from the one or more frames of the at least one video sequence based on the camera location or the camera pose information as represented according to the ECEF 3D Cartesian coordinate system and as associated in the metadata information, wherein results of the post-processing of the at least one video sequence are displayed on a user display.

2. A method of claim 1, wherein the (1) data, (2) information, or (3) at least one signal are further based, at least in part, on the following:
a matching of the local three-dimensional point cloud to the one or more reference point clouds; and
a definition of the camera location information, the camera pose information, or a combination thereof according to the global coordinate system based, at least in part, on the matching.

3. A method of claim 1, wherein the (1) data, (2) information, or (3) at least one signal are further based, at least in part, on the following:
at least one determination of overlay information based, at least in part, on the camera location information, the camera pose information, or a combination thereof; and
a rendering of the overlay information in the one or more images.

4. A method of claim 1, wherein the (1) data, (2) information, (3) at least one signal are further based, at least in part, on the following:
at least one determination of popularity information associated with the camera location information, the camera pose information, or a combination thereof; and
a presentation of one or more representations of the popularity information in at least one user interface of the at least one camera.

5. A method of claim 4, wherein the (1) data, (2) information, or (3) at least one signal are further based, at least in part, on the following:
at least one determination of one or more representative images associated with the camera location, the camera pose information, or a combination thereof; and
a presentation of (a) the one or more representative images; (b) guidance information for navigating to one or more locations, for pointing the at least one camera to one or more targets, or a combination thereof associated with the one or more representative images; (c) one or more indicators for confirming that the at least one camera is at or near the one or more locations associated with the one or more representative images, pointing to the one or more targets, or a combination thereof; (d) or a combination thereof.

6. A method of claim 1, wherein the (1) data, (2) information, or (3) at least one signal are further based, at least in part, on the following:
at least one determination of one or more panoramic images based, at least in part, on the camera location information, the camera pose information, or a combination thereof;
at least one determination of field of view information for the one or more images based, at least in part, on the camera location information, the camera pose information, or a combination thereof; and
an extension of the one or more images with at least a portion of the one or more panoramic images based, at least in part, on the field of view information.

7. A method of claim 1, wherein the (1) data, (2) information, or (3) at least one signal are further based, at least in part, on the following:
at least one determination of the one or more other images associated with other camera location information, other camera pose information, or a combination thereof based, at least in part, on the camera location information, the camera pose information, or a combination thereof; and
an association of the one or more other images with the one or more images for interaction by at least one user during playback of the one or more images.

8. A method of claim 1, wherein one or more other images are further determined based, at least in part, on one or more contextual criteria, and wherein the one or more contextual criteria include, at least in part, one or more temporal criteria.

9. An apparatus comprising:
at least one processor; and
at least one memory including computer program code for one or more programs,
the at least one memory and the computer program code configured to, with the at least one processor, cause the apparatus to perform at least the following,
cause, at least in part, a selection of one or more images from among one or more frames of the at least one video sequence, wherein the one or more images represent, at least in part, a subset of the one or more frames;
process and/or facilitate a processing of the one or more images to determine camera location information, camera pose information, or a combination thereof associated with at least one camera capturing the one or more images, wherein the camera location information, the camera pose information, or a combination thereof is represented according to a local three-dimensional (3D) Cartesian coordinate system and the one or more images are part of at least one video sequence;
process and/or facilitate a processing of the one or more images to determine a local point cloud of one or more objects depicted in the one or more images, wherein the local point cloud is represented according to the local 3D Cartesian coordinate system;
determine one or more reference point clouds represented according to an Earth Centered, Earth Fixed (ECEF) 3D Cartesian coordinate system based, at least in part, on the camera location information, location sensor data, or a combination thereof associated with the at least one camera;
process and/or facilitate a processing of at least one of the one or more reference point clouds represented according to the ECEF 3D Cartesian coordinate system to determine a correspondence of the local point cloud represented in the local 3D Cartesian coordinate system, wherein the correspondence maps the camera location information and the camera pose information from the local 3D Cartesian coordinate system to the ECEF 3D Cartesian coordinate;
cause, at least in part, an association of the camera location information, the camera pose information represented according to the ECEF Cartesian coordinate system, or a combination thereof with the one or more images as metadata information; and
cause, at least in part, a post-processing of the at least one video sequence to extract 3D geo-augmented metadata from the one or more frames of the at least one video sequence based on the camera location or the camera pose information as represented according to the ECEF 3D Cartesian coordinate system and as associated in the metadata information, wherein results of the post-processing of the at least one video sequence are displayed on a user display.

10. An apparatus of claim 9, wherein the apparatus is further caused to:
cause, at least in part, a matching of the local three-dimensional point cloud to one or more reference point clouds; and
cause, at least in part, a definition of the camera location information, the camera pose information, or a combination thereof according to the global coordinate system based, at least in part, on the matching.

11. An apparatus of claim 9, wherein the apparatus is further caused to:
determine overlay information based, at least in part, on the camera location information, the camera pose information, or a combination thereof; and
cause, at least in part, a rendering of the overlay information in the one or more images.

12. An apparatus of claim 9, wherein the one or more images represent one or more viewfinder images of the at least one camera, and wherein the apparatus is further caused to:
determine popularity information associated with the camera location information, the camera pose information, or a combination thereof; and
cause, at least in part, a presentation of one or more representations of the popularity information in at least one user interface of the at least one camera.

13. An apparatus of claim 12, wherein the apparatus is further caused to:
determine one or more representative images associated with the camera location, the camera pose information, or a combination thereof; and
cause, at least in part, a presentation of (a) the one or more representative images; (b) guidance information for navigating to one or more locations, for pointing the at least one camera to one or more targets, or a combination thereof associated with the one or more representative images; (c) one or more indicators for confirming that the at least one camera is at or near the one or more locations associated with the one or more representative images, pointing to the one or more targets, or a combination thereof; (d) or a combination thereof.

14. An apparatus of claim 9, wherein the apparatus is further caused to:
determine one or more panoramic images based, at least in part, on the camera location information, the camera pose information, or a combination thereof;
determine field of view information for the one or more images based, at least in part, on the camera location information, the camera pose information, or a combination thereof; and
cause, at least in part, an extension of the one or more images with at least a portion of the one or more panoramic images based, at least in part, on the field of view information.

15. An apparatus of claim 9, wherein the apparatus is further caused to:
determine one or more other images associated with other camera location information, other camera pose information, or a combination thereof based, at least in part, on the camera location information, the camera pose information, or a combination; and
cause, at least in part, an association of the one or more other images with the one or more images for interaction by at least one user during playback of the one or more images.

16. An apparatus of claim 9, wherein one or more other images are further determined based, at least in part, on one or more contextual criteria, and wherein the one or more contextual criteria include, at least in part, one or more temporal criteria.

* * * * *